(12) United States Patent
Armangau et al.

(10) Patent No.: US 11,625,183 B1
(45) Date of Patent: Apr. 11, 2023

(54) TECHNIQUES FOR DATA LAYOUT ON ROTATING DISK DRIVES

(71) Applicant: Dell Products L.P., Hopkinton, MA (US)

(72) Inventors: Philippe Armangau, Acton, MA (US); Geng Han, Beijing (CN); Jian Gao, Beijing (CN)

(73) Assignee: Dell Products L.P., Hopkinton, MA (US)

( * ) Notice: Subject to any disclaimer, the term of this patent is extended or adjusted under 35 U.S.C. 154(b) by 0 days.

(21) Appl. No.: 17/574,967

(22) Filed: Jan. 13, 2022

(51) Int. Cl.
*G06F 3/06* (2006.01)

(52) U.S. Cl.
CPC .......... *G06F 3/0644* (2013.01); *G06F 3/0614* (2013.01); *G06F 3/0653* (2013.01); *G06F 3/0674* (2013.01); *G06F 3/0689* (2013.01)

(58) Field of Classification Search
CPC .... G06F 3/0644; G06F 3/0614; G06F 3/0653; G06F 3/0674; G06F 3/0689; G06F 3/06
See application file for complete search history.

(56) References Cited

U.S. PATENT DOCUMENTS

| | | | | |
|---|---|---|---|---|
| 10,082,959 | B1 * | 9/2018 | Chen | ............ G06F 3/0689 |
| 10,310,752 | B1 | 6/2019 | Li et al. | |
| 10,496,316 | B1 * | 12/2019 | Proulx | ............ G06F 3/0644 |
| 10,521,145 | B1 | 12/2019 | Foley et al. | |

OTHER PUBLICATIONS

A. Thomasian, G. Fu and C. Han, "Performance of Two-Disk Failure-Tolerant Disk Arrays," in IEEE Transactions on Computers, vol. 56, No. 6, pp. 799-814, Jun. 2007, doi: 10.1109/TC.2007.1041. (Year: 2007).*
U.S. Appl. No. 17/205,305, filed Mar. 18, 2021, entitled Techniques for Storage Management, to Geng Han, et al.
U.S. Appl. No. 16/878,957, filed May 20, 2020, entitled Method, Device and Computer Program Product for Storage Management, to Gao et al.

* cited by examiner

*Primary Examiner* — Khoa D Doan
(74) *Attorney, Agent, or Firm* — Muirhead and Saturnelli, LLC

(57) ABSTRACT

Rotating disk drives can be partitioned into performance partitions (PPs) each including slices having similar performance in accordance with an allowable difference or tolerance for any of data throughput, bandwidth and data transfer rate. Each subdrive can correspond to slices of the rotating disk drives included in a single PP. Each PP can have a performance level denoting a relative performance ranking of PPs. Each PP tier can include PPs across multiple rotating disk drives have the same performance level. Resiliency sets (RSs) can be configured from the PP tiers where each RS can include slices of subdrives from only one of the PP tiers. Physical ubers or units (PUs) can be allocated from the RSs. Each PU can denote a mapped RAID group configured from slices of different subdrives of one RS. Spare slices can be reserved in each RS or a lowest performance PP tier.

20 Claims, 13 Drawing Sheets

TECHNIQUES FOR DATA LAYOUT ON ROTATING DISK DRIVES

BACKGROUND

Systems include different resources used by one or more host processors. The resources and the host processors in the system are interconnected by one or more communication connections, such as network connections. These resources include data storage devices such as those included in data storage systems. The data storage systems are typically coupled to one or more host processors and provide storage services to each host processor. Multiple data storage systems from one or more different vendors can be connected to provide common data storage for the one or more host processors.

A host performs a variety of data processing tasks and operations using the data storage system. For example, a host issues I/O operations, such as data read and write operations, that are subsequently received at a data storage system. The host systems store and retrieve data by issuing the I/O operations to the data storage system containing a plurality of host interface units, disk drives (or more generally storage devices), and disk interface units. The host systems access the storage devices through a plurality of channels provided therewith. The host systems provide data and access control information through the channels to a storage device of the data storage system. Data stored on the storage device is provided from the data storage system to the host systems also through the channels. The host systems do not address the storage devices of the data storage system directly, but rather, access what appears to the host systems as a plurality of files, objects, logical units, logical devices or logical volumes. Thus, the I/O operations issued by the host are directed to a particular storage entity, such as a file or logical device. The logical devices generally include physical storage provisioned from portions of one or more physical drives. Allowing multiple host systems to access the single data storage system allows the host systems to share data stored therein.

SUMMARY

Various embodiments of the techniques of the present disclosure can include a computer-implemented method, a system and a non-transitory computer readable medium comprising: partitioning a plurality of rotating disk drives each into a plurality of slices; partitioning the plurality of rotating disk drives each into a plurality of performance partitions, wherein each of the plurality of performance partitions includes slices from one of the plurality of rotating disk drives having similar performance in accordance with an allowable difference or tolerance for any of data throughput, bandwidth and data transfer rate, wherein each of the plurality of rotating disk drives includes a plurality of subdrives each corresponding to slices of said each rotating disk drive included in a single one of the plurality of performance partitions, wherein each of the plurality of performance partitions of the plurality of rotating disk drives is associated with one of a plurality of performance levels denoting a relative performance ranking of performance partitions, wherein a plurality of performance partition tiers each include performance partitions of the plurality of rotating disk drives having a same one of the plurality of performance levels; configuring a plurality of resiliency sets from the plurality of performance partition tiers, wherein each of the resiliency sets includes slices of subdrives from only one of the plurality of performance partition tiers; and allocating a plurality of physical units from the plurality of resiliency sets, wherein each of the plurality of physical units denotes a mapped RAID group configured from a number of slices of a single one of the plurality of resiliency sets, wherein the number of slices of said each physical unit is determined in accordance with a particular RAID level and configuration of the mapped RAID group, wherein each slice of said each physical unit is included in a different subdrive of the single one of the plurality of resiliency sets.

In at least one embodiment, each of the plurality of resiliency sets can include a number of subdrives each from a different one of the plurality of rotating disk drives. The number of subdrives of said each resiliency set can be between a minimum and a maximum, and wherein the minimum and the maximum can be determined in accordance with a RAID level and configuration of physical units that are allocated from said each resiliency set. The physical units allocated from said each resiliency set can be mapped RAID groups each having the RAID level and configuration associated with said each resiliency set.

In at least one embodiment, processing can include storing user data in the physical units allocated from said each resiliency set in accordance with a RAID algorithm for the RAID level and configuration associated with said each resiliency set. For each of the plurality of resiliency sets having slices from only a single one of the plurality of performance tiers of performance partitions, processing can include reserving a portion of slices of said resiliency set as dedicated spare slices used only for said each resiliency set.

In at least one embodiment, a first of the plurality of rotating disk drives can fail, and processing can further include: performing first processing to reconstruct data of a first plurality of slices of the first rotating disk drive that failed, wherein the first plurality of slices are included in a first of the plurality of performance partitions of the first rotating disk drive and are included in a first of the plurality of resiliency sets that only includes slices from a first of the plurality of performance partition tiers; for each of the first plurality of slices having reconstructed data determined by the first processing, performing second processing comprising: selecting a spare slice from the first resiliency set of slices of the first performance partition tier; and storing the reconstructed data of said each slice of the first rotating disk dive that failed in the spare slice selected from the first resiliency set of slices. The first processing can include reconstructing the data of the first plurality of slices of the first resiliency set using the RAID algorithm for the RAID level and configuration associated with said first resiliency set.

In at least one embodiment, processing can include, for one or more of the plurality of performance partition tiers having a lowest performance of all of the plurality of performance partition tiers, reserving at least a portion of each of the one or more performance partition tiers as dedicated spare slices. The one or more performance partition tiers having the lowest performance include slices can be located at innermost tracks of the plurality of rotating disk drives. A first of the plurality of rotating disk drives can fail, and processing can include: performing first processing to reconstruct data of a first plurality of slices of the first rotating disk drive that failed, wherein the first plurality of slices are included in a first of the plurality of performance partitions of the first rotating disk drive and are included in a first of the plurality of resiliency sets that only includes slices from a first of the plurality of performance partition tiers; for each of the first plurality of slices having reconstructed data determined by the first processing, performing second processing comprising: selecting a spare slice from one of the one or more of the plurality of performance partition tiers having a lowest performance of all of the plurality of performance partitions tiers; and storing, in the spare slice selected from the one performance partition tier, the reconstructed data of said each slice of the first rotating disk dive that failed. The first processing can include reconstructing the data of the first plurality of slices of the first resiliency set using the RAID algorithm for the RAID level and configuration associated with said first resiliency set. Prior to the first rotating disk drive failing, the first rotating disk drive can include a first layout with slices of data stored at first locations on the first rotating disk drive. The first rotating disk drive that failed can be replaced with a new rotating disk drive, and processing can include performing restriping that restores the reconstructed data from the spare slices selected to corresponding slices on the new rotating disk drive in accordance with the first layout of the first rotating disk drive.

BRIEF DESCRIPTION OF THE DRAWINGS

Features and advantages of the present disclosure will become more apparent from the following detailed description of exemplary embodiments thereof taken in conjunction with the accompanying drawings in which.

DETAILED DESCRIPTION OF EMBODIMENT(S)

Figure 1:
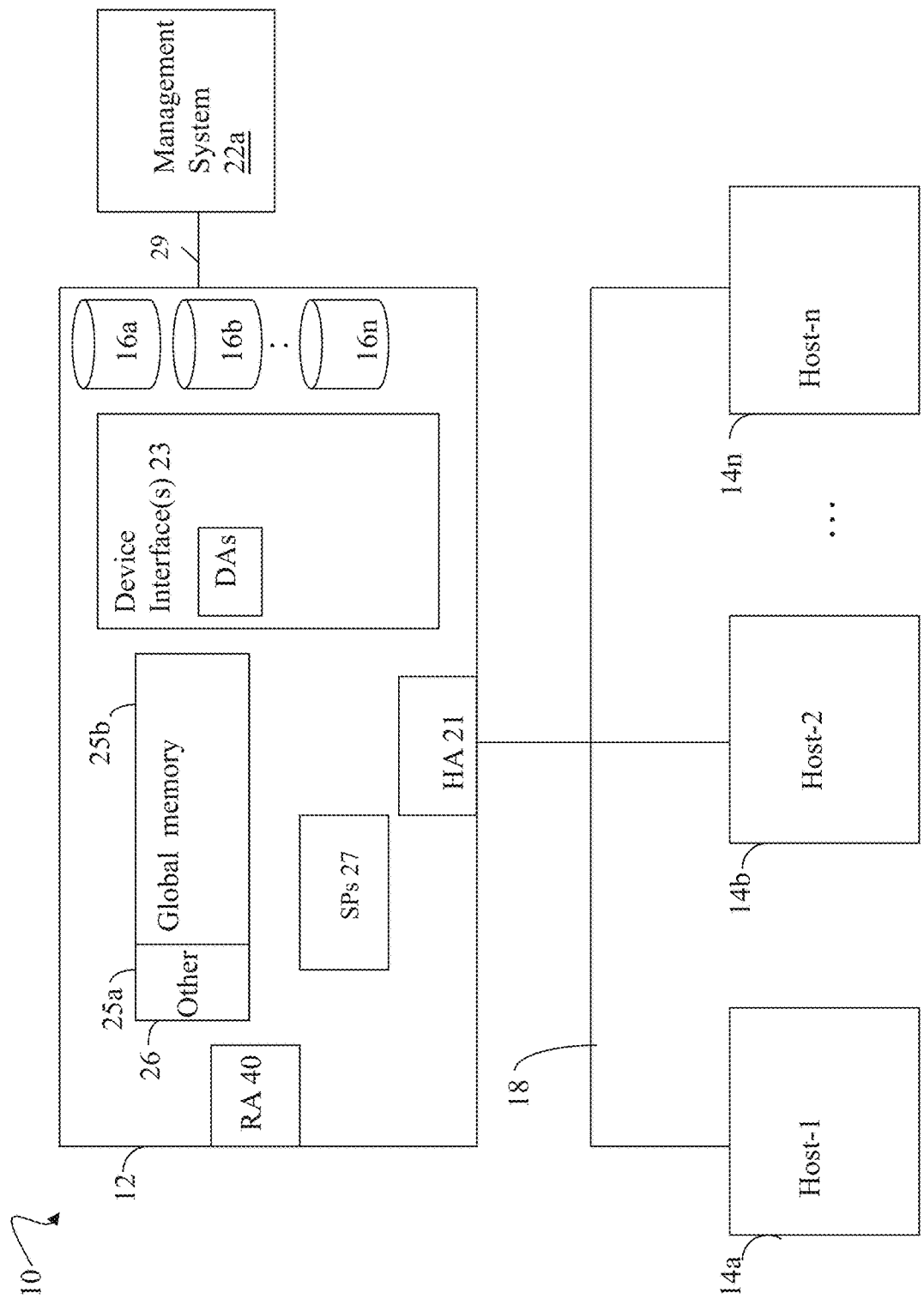
FIG. 1 is an example of components that can be included in a system in accordance with the techniques of the present disclosure.

Data storage systems, as well as more generally any suitable system, can include rotating disk drives, also sometimes referred to as hard disk drives (HDDs). The rotating disk drives include platters of physical storage media upon which data can be recorded or stored. A rotating disk drive typically includes multiple platters each partitioned into concentric circular physical tracks, where each track is typically further partitioned into sectors. In a rotating disk drive including multiple platters, a cylinder can refer to a collection of tracks such as on the multiple platters at the same radius. One characteristic of a rotating disk drive is its angular velocity or speed typically measured in RPMs (revolutions per minute).

The performance characteristics of the tracks can vary depending on their radius or distance from the center of the rotating disk drive. In particular, rotating disk drives generally have a performance characteristic in that the outer tracks have a higher data throughput, bandwidth, and/or data transfer rate than the inner tracks.

Described in the following paragraphs are techniques that can be used to form logical groups of physical storage portions or drive slices having the same or similar performance with respect to any of data throughput, bandwidth and/or data transfer rate. In at least one embodiment, drive slices of rotating disk drives can be characterized as having the same or similar performance with respect to one or more metrics denoting data throughput, bandwidth and/or data transfer rate if the drive slices have one or more measured or expected performance metrics that fall within specified tolerances, limits or ranges. In at least one embodiment, the storage capacity of the rotating disk drive can be divided into multiple performance partitions, where drive slices included in the same performance partition have the same or similar performance with respect to data throughput, bandwidth and/or data transfer rate. In at least one embodiment, each of the rotating drives can include multiple partitions each having a different performance partition level or ranking relative to other partitions. Partitions of multiple rotating drives having the same performance partition level or ranking can be included in the same performance partition tier. Thus, drive slices included in the same performance partition tier have the same or similar performance with respect to data throughput, bandwidth and/or data transfer rate.

In at least one embodiment, a mapped RAID group of drive slices from different rotating disk drives can form a physical uber or unit (PU), where all such drive slices of the same PU can be selected from multiple performance partitions of the same performance partition tier, and where all such drive slices included in the same performance partition tier spanning across multiple drives have the same or similar performance with respect to data throughput, bandwidth and/or data transfer rate.

The foregoing and other aspects of the techniques of the present disclosure are described in more detail in the following paragraphs.

Referring to the FIG. 1, shown is an example of an embodiment of a system 10 that can be used in connection with performing the techniques described herein. The system 10 includes a data storage system 12 connected to the host systems (also sometimes referred to as hosts) 14a-14n through the communication medium 18. In this embodiment of the system 10, the n hosts 14a-14n can access the data storage system 12, for example, in performing input/output (I/O) operations or data requests. The communication medium 18 can be any one or more of a variety of networks or other type of communication connections as known to those skilled in the art. The communication medium 18 can be a network connection, bus, and/or other type of data link, such as a hardwire or other connections known in the art. For example, the communication medium 18 can be the Internet, an intranet, network (including a Storage Area Network (SAN)) or other wireless or other hardwired connection(s) by which the host systems 14a-14n can access and communicate with the data storage system 12, and can also communicate with other components included in the system 10.

Each of the host systems 14a-14n and the data storage system 12 included in the system 10 are connected to the communication medium 18 by any one of a variety of connections in accordance with the type of communication medium 18. The processors included in the host systems 14a-14n and data storage system 12 can be any one of a variety of proprietary or commercially available single or multi-processor system, such as an Intel-based processor, or other type of commercially available processor able to support traffic in accordance with each particular embodiment and application.

It should be noted that the particular examples of the hardware and software that can be included in the data storage system 12 are described herein in more detail, and can vary with each particular embodiment. Each of the hosts 14a-14n and the data storage system 12 can all be located at the same physical site, or, alternatively, can also be located in different physical locations. The communication medium 18 used for communication between the host systems 14a-14n and the data storage system 12 of the system 10 can use a variety of different communication protocols such as block-based protocols (e.g., SCSI (Small Computer System Interface), Fibre Channel (FC), iSCSI), file system-based protocols (e.g., NFS or network file server), and the like. Some or all of the connections by which the hosts 14a-14n and the data storage system 12 are connected to the communication medium 18 can pass through other communication devices, such as switching equipment, a phone line, a repeater, a multiplexer or even a satellite.

Each of the host systems 14a-14n can perform data operations. In the embodiment of the FIG. 1, any one of the host computers 14a-14n can issue a data request to the data storage system 12 to perform a data operation. For example, an application executing on one of the host computers 14a-14n can perform a read or write operation resulting in one or more data requests to the data storage system 12.

It should be noted that although the element 12 is illustrated as a single data storage system, such as a single data storage array, the element 12 can also represent, for example, multiple data storage arrays alone, or in combination with, other data storage devices, systems, appliances, and/or components having suitable connectivity, such as in a SAN (storage area network) or LAN (local area network), in an embodiment using the techniques herein. It should also be noted that an embodiment can include data storage arrays or other components from one or more vendors. In subsequent examples illustrating the techniques herein, reference can be made to a single data storage array by a vendor. However, as will be appreciated by those skilled in the art, the techniques herein are applicable for use with other data storage arrays by other vendors and with other components than as described herein for purposes of example.

The data storage system 12 can be a data storage appliance or a data storage array including a plurality of data storage devices (PDs) 16a-16n. The data storage devices 16a-16n can include one or more types of data storage devices such as, for example, one or more rotating disk drives and/or one or more solid state drives (SSDs). An SSD is a data storage device that uses solid-state memory to store persistent data. SSDs refer to solid state electronics devices as distinguished from electromechanical devices, such as hard drives, having moving parts. Flash devices or flash memory-based SSDs are one type of SSD that contain no moving mechanical parts. The flash devices can be constructed using nonvolatile semiconductor NAND flash memory. The flash devices can include, for example, one or more SLC (single level cell) devices and/or MLC (multi level cell) devices.

The data storage array can also include different types of controllers, adapters or directors, such as an HA 21 (host adapter), RA 40 (remote adapter), and/or device interface(s) 23. Each of the adapters (sometimes also known as controllers, directors or interface components) can be implemented using hardware including a processor with a local memory with code stored thereon for execution in connection with performing different operations. The HAs can be used to manage communications and data operations between one or more host systems and the global memory (GM). In an embodiment, the HA can be a Fibre Channel Adapter (FA) or other adapter which facilitates host communication. The HA 21 can be characterized as a front end component of the data storage system which receives a request from one of the hosts 14a-n. The data storage array can include one or more RAs used, for example, to facilitate communications between data storage arrays. The data storage array can also include one or more device interfaces 23 for facilitating data transfers to/from the data storage devices 16a-16n. The data storage device interfaces 23 can include device interface modules, for example, one or more disk adapters (DAs) (e.g., disk controllers) for interfacing with the flash drives or other physical storage devices (e.g., PDS 16a-n). The DAs can also be characterized as back end components of the data storage system which interface with the physical data storage devices.

One or more internal logical communication paths can exist between the device interfaces 23, the RAs 40, the HAs 21, and the memory 26. An embodiment, for example, can use one or more internal busses and/or communication modules. For example, the global memory portion 25b can be used to facilitate data transfers and other communications between the device interfaces, the HAs and/or the RAs in a data storage array. In one embodiment, the device interfaces 23 can perform data operations using a system cache included in the global memory 25b, for example, when communicating with other device interfaces and other components of the data storage array. The other portion 25a is that portion of the memory that can be used in connection with other designations that can vary in accordance with each embodiment.

The particular data storage system as described in this embodiment, or a particular device thereof, such as a disk or particular aspects of a flash device, should not be construed as a limitation. Other types of commercially available data storage systems, as well as processors and hardware controlling access to these particular devices, can also be included in an embodiment.

The host systems 14a-14n provide data and access control information through channels to the storage systems 12, and the storage systems 12 also provide data to the host systems 14a-n through the channels. The host systems 14a-n do not address the drives or devices 16a-16n of the storage systems directly, but rather access to data can be provided to one or more host systems from what the host systems view as a plurality of logical devices, logical volumes (LVs) which are sometimes referred to herein as logical units (e.g., LUNs). A logical unit (LUN) can be characterized as a disk array or data storage system reference to an amount of storage space that has been formatted and allocated for use to one or more hosts. A logical unit can have a logical unit number that is an I/O address for the logical unit. As used herein, a LUN or LUNs can refer to the different logical units of storage which can be referenced by such logical unit numbers. In some embodiments, at least some of the LUNs do not correspond to the actual or physical disk drives or more generally physical storage devices. For example, one or more LUNs can reside on a single physical disk drive, data of a single LUN can reside on multiple different physical devices, and the like. Data in a single data storage system, such as a single data storage array, can be accessed by multiple hosts allowing the hosts to share the data residing therein. The HAs can be used in connection with communications between a data storage array and a host system. The RAs can be used in facilitating communications between two data storage arrays. The DAs can include one or more type of device interface used in connection with facilitating data transfers to/from the associated disk drive(s) and LUN (s) residing thereon. For example, such device interfaces can include a device interface used in connection with facilitating data transfers to/from the associated flash devices and LUN(s) residing thereon. It should be noted that an embodiment can use the same or a different device interface for one or more different types of devices than as described herein.

In an embodiment in accordance with the techniques herein, the data storage system can be characterized as having one or more logical mapping layers in which a logical device of the data storage system is exposed to the host whereby the logical device is mapped by such mapping layers of the data storage system to one or more physical devices. Additionally, the host can also have one or more additional mapping layers so that, for example, a host side logical device or volume is mapped to one or more data storage system logical devices as presented to the host.

It should be noted that although examples of the techniques herein can be made with respect to a physical data storage system and its physical components (e.g., physical hardware for each HA, DA, HA port and the like), the techniques herein can be performed in a physical data storage system including one or more emulated or virtualized components (e.g., emulated or virtualized ports, emulated or virtualized DAs or HAs), and also a virtualized or emulated data storage system including virtualized or emulated components.

Also shown in the FIG. 1 is a management system 22a that can be used to manage and monitor the data storage system 12. In one embodiment, the management system 22a can be a computer system which includes data storage system management software or application that executes in a web browser. A data storage system manager can, for example, view information about a current data storage configuration such as LUNs, storage pools, and the like, on a user interface (UI) in a display device of the management system 22a. Alternatively, and more generally, the management software can execute on any suitable processor in any suitable system. For example, the data storage system management software can execute on a processor of the data storage system 12.

Information regarding the data storage system configuration can be stored in any suitable data container, such as a database. The data storage system configuration information stored in the database can generally describe the various physical and logical entities in the current data storage system configuration. The data storage system configuration information can describe, for example, the LUNs configured in the system, properties and status information of the configured LUNs (e.g., LUN storage capacity, unused or available storage capacity of a LUN, consumed or used capacity of a LUN), configured RAID groups, properties and status information of the configured RAID groups (e.g., the RAID level of a RAID group, the particular PDs that are members of the configured RAID group), the PDs in the system, properties and status information about the PDs in the system, local replication configurations and details of existing local replicas (e.g., a schedule of when a snapshot is taken of one or more LUNs, identify information regarding existing snapshots for a particular LUN), remote replication configurations (e.g., for a particular LUN on the local data storage system, identify the LUN's corresponding remote counterpart LUN and the remote data storage system on which the remote LUN is located), data storage system performance information such as regarding various storage objects and other entities in the system, and the like.

It should be noted that each of the different controllers or adapters, such as each HA, DA, RA, and the like, can be implemented as a hardware component including, for example, one or more processors, one or more forms of memory, and the like. Code can be stored in one or more of the memories of the component for performing processing.

The device interface, such as a DA, performs I/O operations on a physical device or drive 16a-16n. In the following description, data residing on a LUN can be accessed by the device interface following a data request in connection with I/O operations. For example, a host can issue an I/O operation which is received by the HA 21. The I/O operation can identify a target location from which data is read from, or written to, depending on whether the I/O operation is, respectively, a read or a write operation request. The target location of the received I/O operation can be expressed in terms of a LUN and logical address or offset location (e.g., LBA or logical block address) on the LUN. Processing can be performed on the data storage system to further map the target location of the received I/O operation, expressed in terms of a LUN and logical address or offset location on the LUN, to its corresponding physical storage device (PD) and location on the PD. The DA which services the particular PD can further perform processing to either read data from, or write data to, the corresponding physical device location for the I/O operation.

It should be noted that an embodiment of a data storage system can include components having different names from that described herein but which perform functions similar to components as described herein. Additionally, components within a single data storage system, and also between data storage systems, can communicate using any suitable technique that can differ from that as described herein for exemplary purposes. For example, element 12 of the FIG. 1 can be a data storage system, such as a data storage array, that includes multiple storage processors (SPs). Each of the SPs 27 can be a CPU including one or more "cores" or processors and each having their own memory used for communication between the different front end and back end components rather than utilize a global memory accessible to all storage processors. In such embodiments, the memory 26 can represent memory of each such storage processor.

Generally, the techniques herein can be used in connection with any suitable storage system, appliance, device, and the like, in which data is stored. For example, an embodiment can implement the techniques herein using a midrange data storage system as well as a high end or enterprise data storage system.

The data path or I/O path can be characterized as the path or flow of I/O data through a system. For example, the data or I/O path can be the logical flow through hardware and software components or layers in connection with a user, such as an application executing on a host (e.g., more generally, a data storage client) issuing I/O commands (e.g., SCSI-based commands, and/or file-based commands) that read and/or write user data to a data storage system, and also receive a response (possibly including requested data) in connection such I/O commands.

The control path, also sometimes referred to as the management path, can be characterized as the path or flow of data management or control commands through a system. For example, the control or management path can be the logical flow through hardware and software components or layers in connection with issuing data storage management command to and/or from a data storage system, and also receiving responses (possibly including requested data) to such control or management commands. For example, with reference to the FIG. 1, the control commands can be issued from data storage management software executing on the management system 22a to the data storage system 12. Such commands can be, for example, to establish or modify data services, provision storage, perform user account management, and the like.

The data path and control path define two sets of different logical flow paths. In at least some of the data storage system configurations, at least part of the hardware and network connections used for each of the data path and control path can differ. For example, although both control path and data path can generally use a network for communications, some of the hardware and software used can differ. For example, with reference to the FIG. 1, a data storage system can have a separate physical connection 29 from a management system 22a to the data storage system 12 being managed whereby control commands can be issued over such a physical connection 29. However in at least one embodiment, user I/O commands are never issued over such a physical connection 29 provided solely for purposes of connecting the management system to the data storage system. In any case, the data path and control path each define two separate logical flow paths.

Figure 2:
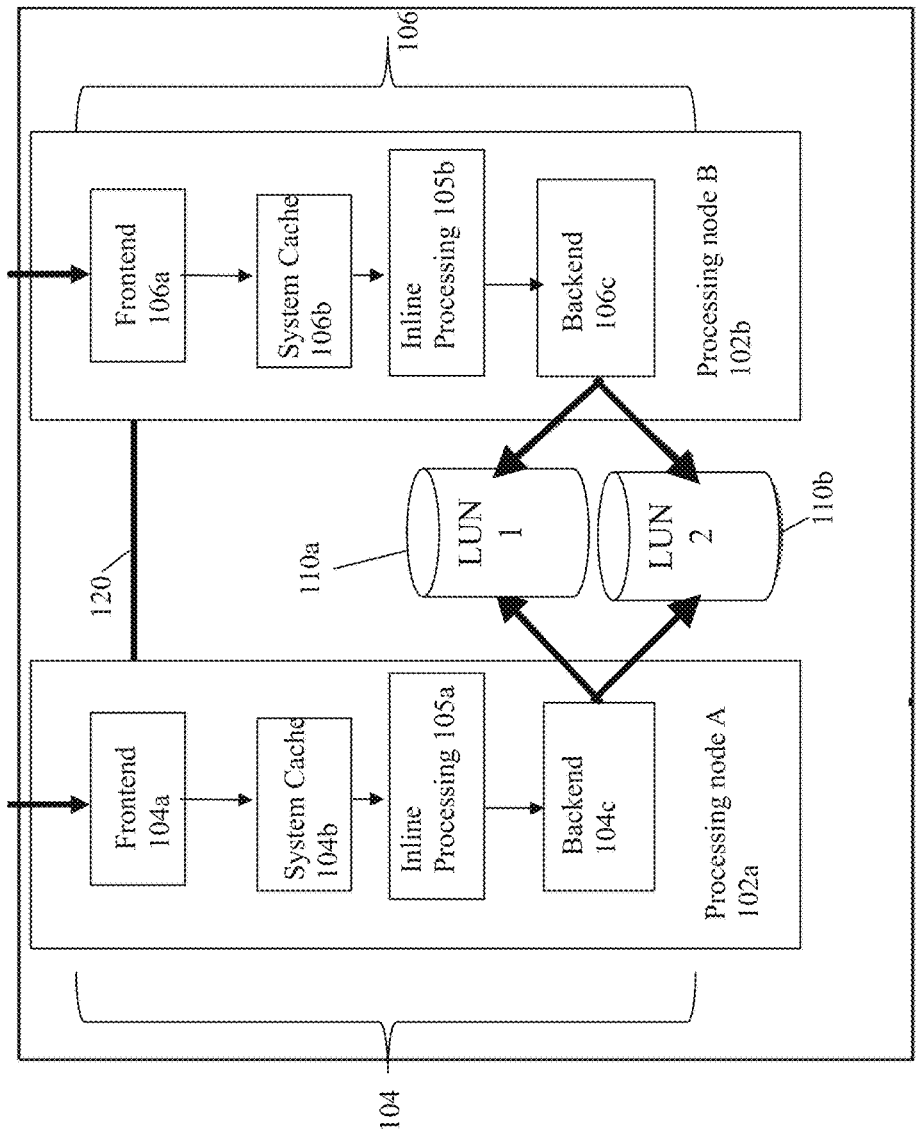
FIG. 2 is an example illustrating the I/O path or data path in connection with processing data in an embodiment in accordance with the techniques of the present disclosure.

With reference to the FIG. 2, shown is an example 100 illustrating components that can be included in the data path in at least one existing data storage system in accordance with the techniques herein. The example 100 includes two processing nodes A 102a and B 102b and the associated software stacks 104, 106 of the data path, where I/O requests can be received by either processing node 102a or 102b. In the example 200, the data path 104 of processing node A 102a includes: the frontend (FE) component 104a (e.g., an FA or front end adapter) that translates the protocol-specific request into a storage system-specific request; a system cache layer 104b where data is temporarily stored; an inline processing layer 105a; and a backend (BE) component 104c that facilitates movement of the data between the system cache and non-volatile physical storage (e.g., back end physical non-volatile storage devices or PDs accessed by BE components such as DAs as described herein). During movement of data in and out of the system cache layer 104b (e.g., such as in connection with read data from, and writing data to, physical storage 110a, 110b), inline processing can be performed by layer 105a. Such inline processing operations of 105a can be optionally performed and can include any one of more data processing operations in connection with data that is flushed from system cache layer 104b to the back-end non-volatile physical storage 110a, 110b, as well as when retrieving data from the back-end non-volatile physical storage 110a, 110b to be stored in the system cache layer 104b. In at least one embodiment, the inline processing can include, for example, performing one or more data reduction operations such as data deduplication or data compression. The inline processing can include performing any suitable or desirable data processing operations as part of the I/O or data path.

In a manner similar to that as described for data path 104, the data path 106 for processing node B 102b has its own FE component 106a, system cache layer 106b, inline processing layer 105b, and BE component 106c that are respectively similar to the components 104a, 104b, 105a and 104c. The elements 110a, 110b denote the non-volatile BE physical storage provisioned from PDs for the LUNs, whereby an I/O can be directed to a location or logical address of a LUN and where data can be read from, or written to, the logical address. The LUNs 110a, 110b are examples of storage objects representing logical storage entities included in an existing data storage system configuration. Since, in this example, writes directed to the LUNs 110a, 110b can be received for processing by either of the nodes 102a and 102b, the example 100 illustrates what is also referred to as an active-active configuration.

In connection with a write operation received from a host and processed by the processing node A 102a, the write data can be written to the system cache 104b, marked as write pending (WP) denoting it needs to be written to the physical storage 110a, 110b and, at a later point in time, the write data can be destaged or flushed from the system cache to the physical storage 110a, 110b by the BE component 104c. The write request can be considered complete once the write data has been stored in the system cache whereby an acknowledgement regarding the completion can be returned to the host (e.g., by component the 104a). At various points in time, the WP data stored in the system cache is flushed or written out to the physical storage 110a, 110b.

In connection with the inline processing layer 105a, prior to storing the original data on the physical storage 110a, 110b, one or more data reduction operations can be performed. For example, the inline processing can include performing data compression processing, data deduplication processing, and the like, that can convert the original data (as stored in the system cache prior to inline processing) to a resulting representation or form which is then written to the physical storage 110a, 110b.

In connection with a read operation to read a block of data, a determination is made as to whether the requested read data block is stored in its original form (in system cache 104b or on physical storage 110a, 110b), or whether the requested read data block is stored in a different modified form or representation. If the requested read data block (which is stored in its original form) is in the system cache, the read data block is retrieved from the system cache 104b and returned to the host. Otherwise, if the requested read data block is not in the system cache 104b but is stored on the physical storage 110a, 110b in its original form, the requested data block is read by the BE component 104c from the backend storage 110a, 110b, stored in the system cache and then returned to the host.

If the requested read data block is not stored in its original form, the original form of the read data block is recreated and stored in the system cache in its original form so that it can be returned to the host. Thus, requested read data stored on physical storage 110a, 110b can be stored in a modified form where processing is performed by 105a to restore or convert the modified form of the data to its original data form prior to returning the requested read data to the host.

Also illustrated in FIG. 2 is an internal network interconnect 120 between the nodes 102a, 102b. In at least one embodiment, the interconnect 120 can be used for internode communication between the nodes 102a, 102b.

In connection with at least one embodiment in accordance with the techniques herein, each processor or CPU can include its own private dedicated CPU cache (also sometimes referred to as processor cache) that is not shared with other processors. In at least one embodiment, the CPU cache, as in general with cache memory, can be a form of fast memory (relatively faster than main memory which can be a form of RAM). In at least one embodiment, the CPU or processor cache is on the same die or chip as the processor and typically, like cache memory in general, is far more expensive to produce than normal RAM which can used as main memory. The processor cache can be substantially faster than the system RAM such as used as main memory and contains information that the processor will be immediately and repeatedly accessing. The faster memory of the CPU cache can, for example, run at a refresh rate that's closer to the CPU's clock speed, which minimizes wasted cycles. In at least one embodiment, there can be two or more levels (e.g., L1, L2 and L3) of cache. The CPU or processor cache can include at least an L1 level cache that is the local or private CPU cache dedicated for use only by that particular processor. The two or more levels of cache in a system can also include at least one other level of cache (LLC or lower level cache) that is shared among the different CPUs. The L1 level cache serving as the dedicated CPU cache of a processor can be the closest of all cache levels (e.g., L1-L3) to the processor which stores copies of the data from frequently used main memory locations. Thus, the system cache as described herein can include the CPU cache (e.g., the L1 level cache or dedicated private CPU/processor cache) as well as other cache levels (e.g., the LLC) as described herein. Portions of the LLC can be used, for example, to initially cache write data which is then flushed to the backend physical storage such as BE PDs providing non-volatile storage. For example, in at least one embodiment, a RAM based memory can be one of the caching layers used as to cache the write data that is then flushed to the backend physical storage. When the processor performs processing, such as in connection with the inline processing 105a, 105b as noted above, data can be loaded from the main memory and/or other lower cache levels into its CPU cache.

In at least one embodiment, the data storage system can be configured to include one or more pairs of nodes, where each pair of nodes can be described and represented as the nodes 102a-b in the FIG. 2. For example, a data storage system can be configured to include at least one pair of nodes and at most a maximum number of node pairs, such as for example, a maximum of 4 node pairs. The maximum number of node pairs can vary with embodiment. In at least one embodiment, a base enclosure can include the minimum single pair of nodes and up to a specified maximum number of PDs. In some embodiments, a single base enclosure can be scaled up to have additional BE non-volatile storage using one or more expansion enclosures, where each expansion enclosure can include a number of additional PDs. Further, in some embodiments, multiple base enclosures can be grouped together in a load-balancing cluster to provide up to the maximum number of node pairs. Consistent with other discussion herein, each node can include one or more processors and memory. In at least one embodiment, each node can include two multi-core processors with each processor of the node having a core count of between 8 and 28 cores. In at least one embodiment, the PDs can all be non-volatile SSDs, such as flash-based storage devices and storage class memory (SCM) devices. It should be noted that the two nodes configured as a pair can also sometimes be referred to as peer nodes. For example, the node A 102a is the peer node of the node B 102b, and the node B 102b is the peer node of the node A 102a.

In at least one embodiment, the data storage system can be configured to provide both block and file storage services with a system software stack that includes an operating system running directly on the processors of the nodes of the system.

In at least one embodiment, the data storage system can be configured to provide block-only storage services (e.g., no file storage services). A hypervisor can be installed on each of the nodes to provide a virtualized environment of virtual machines (VMs). The system software stack can execute in the virtualized environment deployed on the hypervisor. The system software stack (sometimes referred to as the software stack or stack) can include an operating system running in the context of a VM of the virtualized environment. Additional software components can be included in the system software stack and can also execute in the context of a VM of the virtualized environment.

In at least one embodiment, each pair of nodes can be configured in an active-active configuration as described elsewhere herein, such as in connection with FIG. 2, where each node of the pair has access to the same PDs providing BE storage for high availability. With the active-active configuration of each pair of nodes, both nodes of the pair process I/O operations or commands and also transfer data to and from the BE PDs attached to the pair. In at least one embodiment, BE PDs attached to one pair of nodes is not be shared with other pairs of nodes. A host can access data stored on a BE PD through the node pair associated with or attached to the PD.

In at least one embodiment, each pair of nodes provides a dual node architecture where both nodes of the pair can be identical in terms of hardware and software for redundancy and high availability. Consistent with other discussion herein, each node of a pair can perform processing of the different components (e.g., FA, DA, and the like) in the data path or I/O path as well as the control or management path. Thus, in such an embodiment, different components, such as the FA, DA and the like of FIG. 1, can denote logical or functional components implemented by code executing on the one or more processors of each node. Each node of the pair can include its own resources such as its own local (i.e., used only by the node) resources such as local processor(s), local memory, and the like.

Data storage systems, as well as more generally any suitable system, can include rotating disk drives, also sometimes referred to as hard disk drives (HDDs). The rotating disk drives can be used as the BE PDs providing non-volatile storage. More generally, the rotating disk drives can be used for any suitable purpose providing non-volatile storage. The rotating PDs can include platters of physical storage media upon which data can be recorded or stored. A rotating disk drive typically includes multiple platters each partitioned into concentric circular physical tracks, where each track is typically further partitioned into sectors. In a rotating disk drive including multiple platters, a cylinder can refer to a collection of tracks such as on the multiple platters at the same radius. One characteristic of a rotating disk drive is its angular velocity or speed typically measured in RPMs (revolutions per minute).

The performance characteristics of the tracks can vary depending on their radius or distance from the center of the rotating disk drive. In particular, rotating disk drives generally have a performance characteristic in that the outer tracks have a higher data throughput, bandwidth, or data transfer rate than the inner tracks.

Described in the following paragraphs are techniques that can be used to form logical groups of physical storage portions or drive slices having the same or similar performance with respect to any of data throughput, bandwidth and/or data transfer rate. In at least one embodiment, drive slices of rotating disk drives can be characterized as having the same or similar performance with respect to one or more metrics denoting data throughput, bandwidth and/or data transfer rate if the drive slices have one or more measured or expected performance metrics that fall within specified tolerances, limits or ranges. In at least one embodiment, the storage capacity of the rotating disk drive can be divided into multiple performance partitions, where drive slices included in the same performance partition have the same or similar performance with respect to data throughput, bandwidth and/or data transfer rate. In at least one embodiment, each of the rotating drives can include multiple partitions each having a different performance partition level or ranking relative to other partitions. Partitions of multiple rotating drives having the same performance partition level or ranking can be included in the same performance partition tier. Thus, drive slices included in the same performance partition tier have the same or similar performance with respect to data throughput, bandwidth and/or data transfer rate.

In at least one embodiment, a mapped RAID group of drive slices from different rotating disk drives can form a physical uber or unit (PU), where all such drive slices of the same PU can be selected from multiple performance partitions of the same performance partition tier, and where all such drive slices included in the same performance partition tier spanning across multiple drives have the same or similar performance with respect to data throughput, bandwidth and/or data transfer rate.

The foregoing and other aspects of the techniques of the present disclosure are described in more detail in the following paragraphs.

Provided below is an initial discussion regarding traditional RAID groups, mapped RAID groups or PUs, and related concepts.

As known in the art, a RAID (redundant array of independent disks) group is a group of physical storage devices or members providing different levels of protection and fault tolerance within the RAID group. A RAID group provides an associated level of protection based on a particular configuration of the physical drives comprising the RAID group. The particular level of protection provided by a RAID group may be one of standard and/or well-known levels and configurations (e.g., RAID-0, RAID-1, RAID-5, RAID-6, and the like). In at least one embodiment, physical drives can be configured into RAID groups of one or more RAID levels.

LUNs can have storage provisioned from, or built on top of, the RAID groups.

RAID may be characterized in one aspect as a data storage virtualization technology that combines multiple PDs into a single logical entity, a RAID group (RG) for the purposes of data redundancy, performance improvement, or both. Data is distributed across the drives of the traditional RG in one of several ways, referred to as RAID levels, depending on the required level of redundancy and performance. With a traditional RG including a number of PDs, each PD can be characterized as a RG drive member. Traditional RG data layout includes placing stripes of user data and, if applicable, parity data or information across all PDs of the RG. For example, if a RG includes 5 PDs for a RAID-5 "4+1" configuration with 4 user data drives or members and 1 parity drive or member, data is placed on the RG PDs so that each stripe includes user data stored on 4 PDs and parity information stored on 1 PD. With traditional RGs, each PD can only belong to a single RG.

Figure 3:
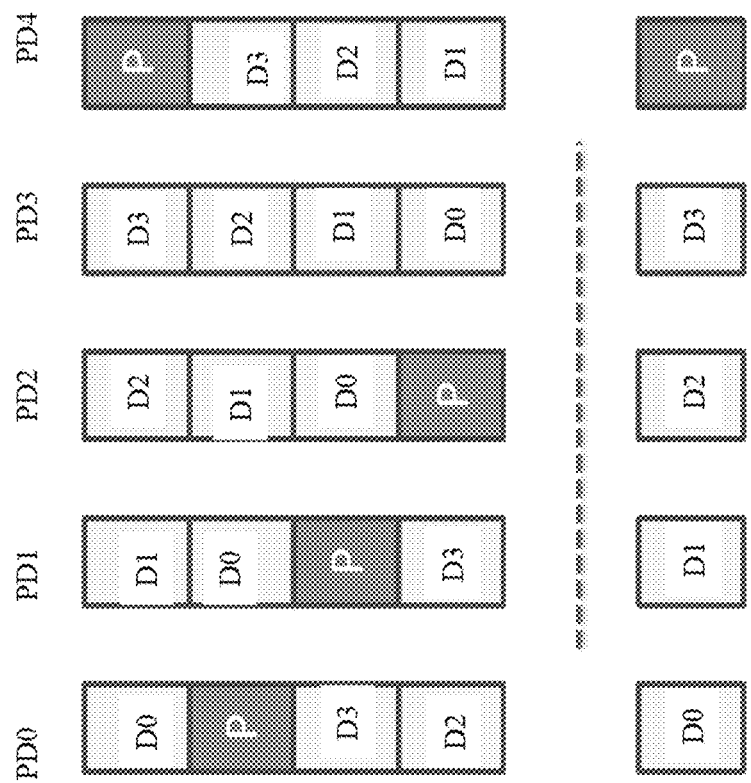
FIGS. 3 and 4 are examples illustrating a traditional RAID group configurations.
Figure 4:
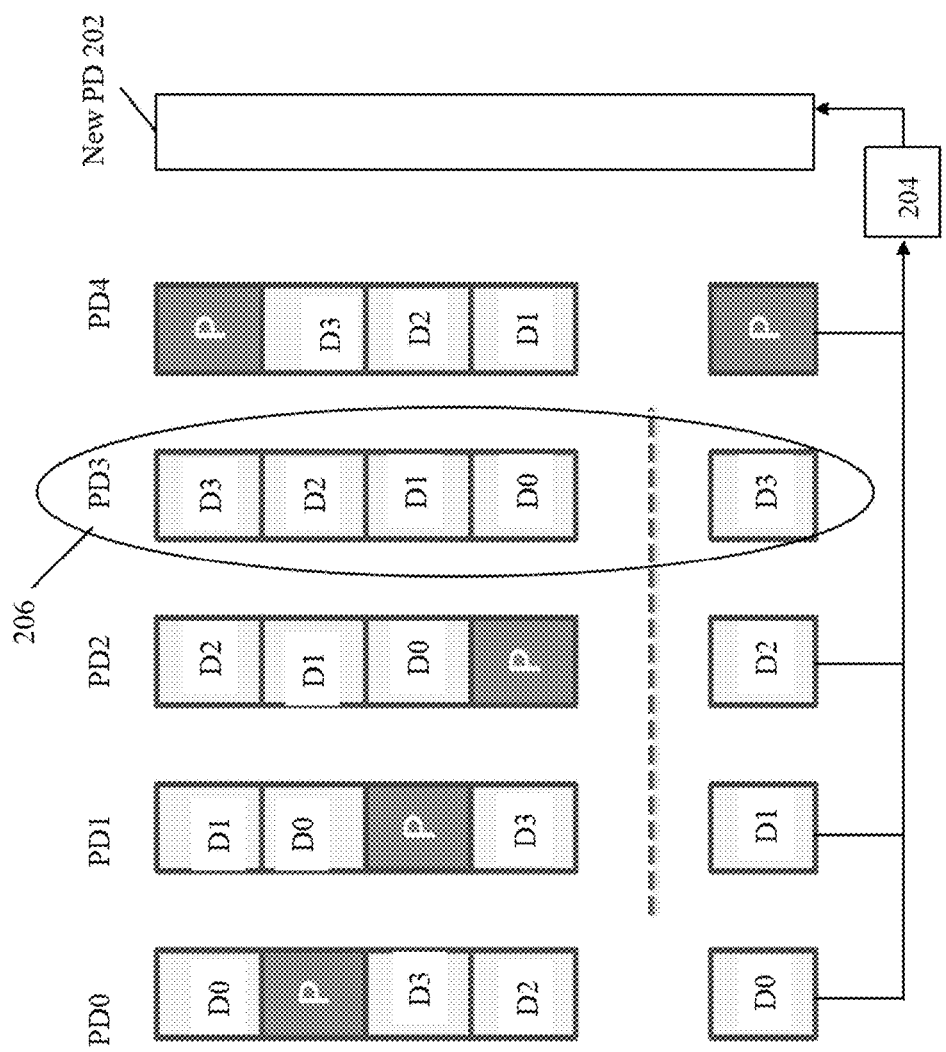

With reference now to FIG. 3, shown is an example 150 illustrating a traditional RAID-5 layout of a RG having a "4+1" configuration, where the 5 member PDs of the RG include 4 data PDs and 1 parity PD. As known in the art, RAID 5 provides block level striping with distributed parity. Parity information can be distributed among the PDs of the RG. In the example 150 of FIG. 3, each stripe includes 5 blocks, which includes 4 data blocks (denoted as D0, D1, D2, D3 and D4) and 1 parity block (denoted as P). Upon failure of a single PD of the RAID-5 RG, such as failure of the PD3 206 as illustrated with reference to the example 200 of FIG. 4, subsequent read requests for user data stored on the failed PD3 206 can be determined from the distributed parity such that no data is lost. Additionally, a hot spare PD 202 may be selected to replace the failed PD3 206 and all the data of the failed PD3 206 can be rebuilt 204 and written to the new PD 202. Generally, data of a failed PD of a RG can be calculated or determined using RG rebuild algorithms and procedures which utilize existing user data and/or parity information from other remaining healthy PDs of the RG. The particular data recovery and rebuild algorithm varies with the particular RAID algorithm used to initially store the user data and parity information across the PDs of the RG.

With the new physical storage technologies emerging, the storage capacity of each single PD can increase and the rebuild time to recover the data of the failed PD in a RG is increased accordingly. As a result, for example with a RAID-5, 4+1, RG configuration as illustrated in connection with FIGS. 3 and 4, a customer can face an increased risk of a double PD failure, which may result in lost data if the RAID group rebuild time is not reduced. However, the rebuild time is subject to the write bandwidth of the hot spare PD replacing the failed PD. With the traditional RAID group such as in FIGS. 3 and 4, the write bandwidth of the hot spare PD can be a bottleneck and, using such traditional RAID, it can be difficult to reduce the rebuild time. As a result, an embodiment in accordance with the techniques of the present disclosure can use mapped RAID technology generally illustrated in connection with FIGS. 5A and 5B.

With mapped RAID, a pool of PDs can be utilized where each PD of the pool is divided into drive slices (sometimes simply referred to as slices). Each drive slice can be a same size that is generally any suitable size such as, for example, 4 GB. A single mapped RG having a desired RAID level and configuration with M members can be formed by selecting M drive slices from M different PDs of the pool. Generally, in at least one embodiment, the pool of PDs can have a number of PDs, N, that is greater than M. For example, for a RAID-5 4+1 configuration noted above, the pool of PDs can have more than 5 PDs and a single mapped RG can be formed by selecting one drive slice from each of M different PDs of the pool. In this manner, each member of the mapped RAID group can be a logically partitioned drive slice from a different PD of the pool.

In at least one embodiment, each of the mapped RAID groups can be referred to as a physical uber or physical unit (PU). In some embodiments, a data storage tier can be a set of PUs where each PU of the set has a same RAID configuration and level such as, for example, all PUs are a RAID-5 level with a 4+1 configuration. In at least one embodiment, it can be a requirement that each drive slice of a mapped RG or PU be on a different PD of the pool. In this manner, each drive slice of a PU or mapped RG is on a different PD of the pool.

Figure 5A:
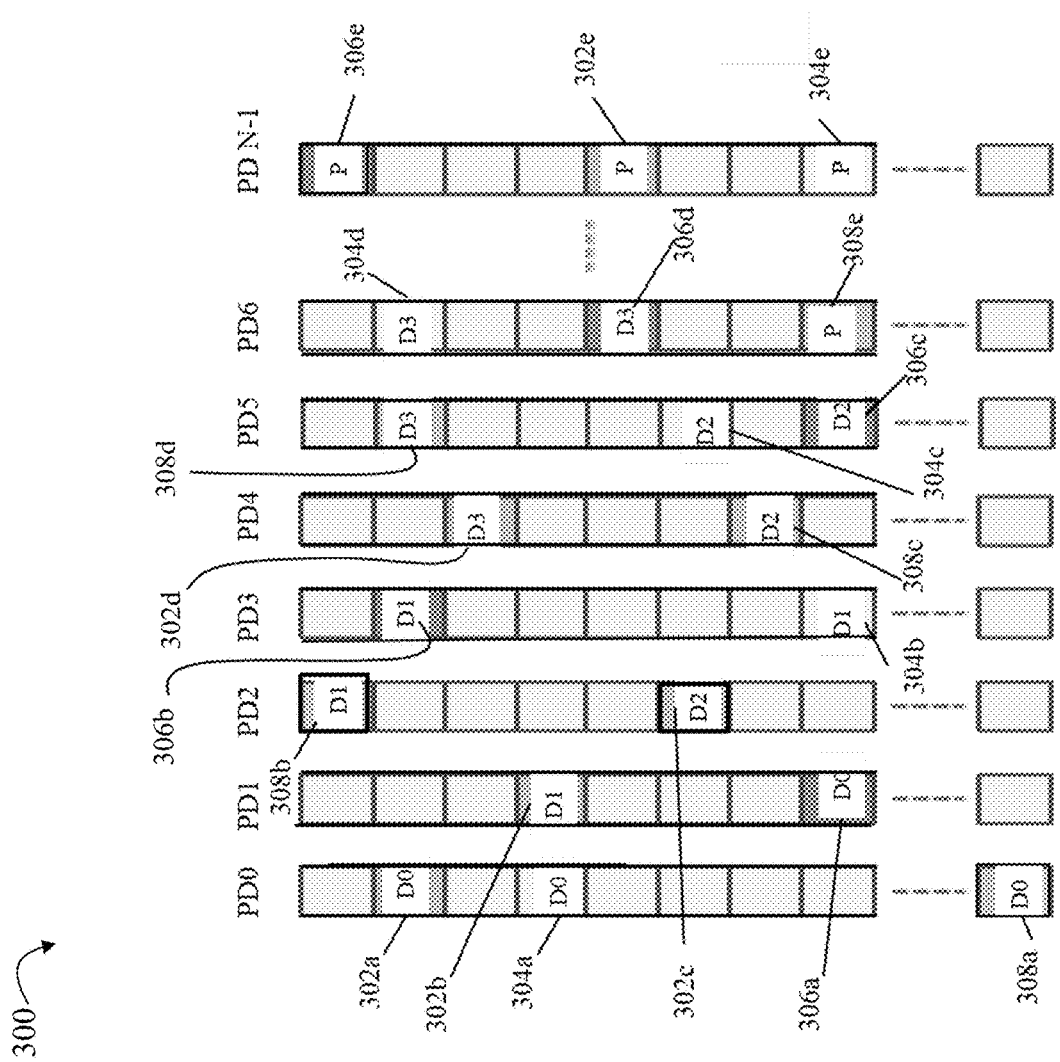
FIGS. 5A, 5B, 6 and 7 are examples illustrating mapped RAID configurations of physical units or ubers (PUs).

Referring to FIG. 5A, shown is an example generally illustrating use of mapped RAID techniques. The example 300 includes a pool of N PDs, where N is an integer having a minimum value depending on the particular RAID configuration and drive members. The N PDs can be referred to using indices 0 through N-1, inclusively. For example, consider a RAID-5, 4+1, configuration such as described above in connection with FIGS. 2 and 3 having M=5 members including 4 data members and 1 parity member. In at least one embodiment, the minimum number of PDs in the pools used for mapped RAID can be at least M, the number of RAID group members, which is 5 in this example. Thus, the number of PDs N can be greater than or equal to M. It should be noted that the foregoing M can also denote the RAID extent width or number of drive slices in each mapped RG or PU. Generally, mapped RGs can be created on top of a pool of the N PDs. Each PD of the pool used for configuring mapped RGs or PUs can be viewed as a set of continuous non-overlapping fixed size drive slices.

Each mapped RG or PU can include M different drive slices each selected from a different one of the N PDs. For example, a first mapped RG or PU A can include 5 drive slices 302a-e; a second mapped RG or PU B can include 5 drives slices 304a-e; a third mapped RG or PU C can include 5 drives slices 306a-e; and a fourth mapped RG or PU can include 5 drives slices 308a-e. In this example 300, each drive slice used for storing user data is denoted Dn, where n is an integer in the range of 0-3. Each drive slice used for storing parity information is denoted P. Drive slices which are free (unallocated) or otherwise reserved may not include any P or Dn designation in FIG. 5A.

Some of the drive slices can be reserved on each of the N PDs for use as hot spare drive slices rather than reserve an entire PD as a hot spare as in traditional RAID groups. When one of the N PDs of the pool fails, for each drive slice on the failed PD that is included in a mapped RG or PU and which therefore includes valid data (e.g., user data or parity information), a replacement drive slice can be obtained by selecting another replacement drive slice from one of the other remaining active, healthy PDs of the pool. In at least one embodiment, such selection can be based on specified criteria. For example in at least one embodiment, when selecting drive slices for inclusion in a mapped RG or PU for such replacement due to a failed PD, the selection criteria can include selecting the replacement drive slices so as to guarantee that each drive slice of each mapped RG or PU is on a different PD of the pool.

Figure 5B:
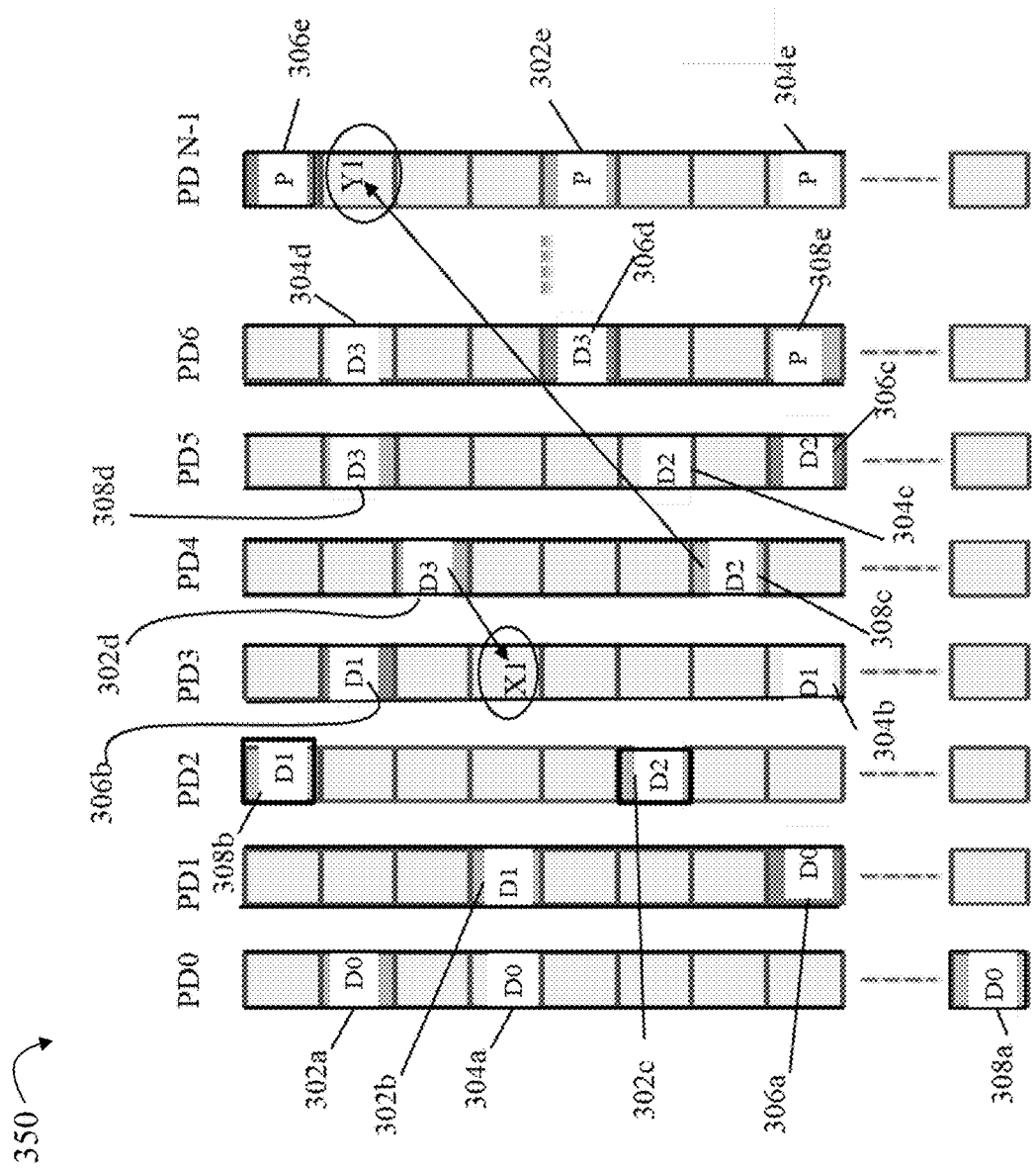

For example to further illustrate, reference is made to FIG. 5B. Assume the PD4 fails whereby the drive slices 302d and 308c can be relocated to another one of the N PDs. In accordance with the criteria noted above, drive slice 302d can be relocated to the drive slice X1 on PD3, and the drive slice 308c can be relocated to the drive slice Y1 on PD N-1. Additionally, as with traditional RGs, existing RG rebuild and data recovery algorithms can be used to reconstruct or rebuild the data of the drives slices 302d and 308c of the failed PD4. In this manner, subsequent read requests for user data stored on the failed PD4 can be determined from the distributed parity such that no data is lost. The data of the slices 302d and 308c of the failed PD4 can be rebuilt and written, respectively, to the new drive slices X1 and Y1. Consistent with discussion above, generally, data of a failed PD of a mapped RG or PU can be calculated or determined using RG rebuild algorithms and procedures which utilize existing user data and/or parity information from other remaining healthy drive slices of the mapped RG or PU. The particular data recovery and rebuild algorithm varies with the particular RAID algorithm used to initially store the user data and parity information across the slices of the mapped RG or PU.

As will be appreciated by those skilled in the art, with mapped RAID techniques such as illustrated in the FIGS. 5A and 5B, there no longer exists the limitation of the single spare PD write bandwidth in connection with RG rebuilds, since mapped RGs or PUs replace disk slices of failed PD with drive slices on different PDs. Additionally, using spare drive slices of multiple PDs of the pool provides an advantage over traditional RGs where an entire spare PD can remain unused or idle while remaining a standby PD for use in the event of a PD failure.

Using mapped RGs or PUs as illustrated in FIGS. 5A and 5B with PUs configured in accordance with RAID-5 with a 4+1 configuration as noted above, in the event of a failure of a PD, such as the PD4, the slices of user data and parity information stored on the failed PD4 can be rebuilt using the data and parity information from the remaining drive slices of the other PDs based on the RAID-5 rebuild algorithm. The rebuilt slices of user data and parity information of the failed PD4 can be stored on any suitable ones of the spare capacity drive slices, such as X1 and Y1, so long as each drive slice of each PU or mapped RG is included in a different PD.

In order to maximize RG rebuild performance in at least one embodiment in accordance with the techniques of the present disclosure, processing can be performed to evenly distribute (as evenly as possible) mapped RGs or PUs across all PDs of the pool when creating or forming mapped RGs or PUs.

It should be noted that although FIGS. 5A and 5B illustrate using only a single RAID-5, 4+1 mapped RG or PU configuration with the pool of N PDs, more generally more than one RAID level and configuration can be configured for mapped RGs or PUs from other pools of PDs. For example, an embodiment in accordance with the techniques of the present disclosure can configure a first set of PUs or mapped RGs from a first pool of PDs having the RAID-5 4+1 configuration; can configure a second set of PUs of mapped RGs from a second pool of PDs having a RAID-6, 6+2 configuration (e.g., 6 data drives or members and 2 parity drives or members); and can also configure a third set of PUs of mapped RGs from a third pool of PDs having a RAID-1 configuration (e.g., no parity with data mirroring).

In some instances, a customer can add or expand the physical storage capacity in a system by adding new PDs to one or more pools used to configure or provision storage for PUs. For example, with reference to FIGS. 5A and 5B, the storage capacity of the system can be expanded by adding one or more new PDs to the existing pool of N PDs. In at least one embodiment, in order to utilize both the existing N PDs and the newly added one or more PDs, the existing organization and logical structure or layout for storing data on the existing N PDs may be expanded across the aggregate of both the N PDs and the newly added one or more PDs. For example, assume that a single new PD is added to the existing pool of N PDs. In at least one embodiment, processing can be performed to relocate data from drive slices of the existing pool of N PDs to free drive slices of the newly added PD.

In at least one embodiment, the newly added PD can be partitioned into drive slices having the same size as the drive slices of the existing N PDs of the pool. Initially all drive slices on the newly added PD are designated as free or available for configuration in a mapped RG or PU. In at least one embodiment, processing can be performed to distribute or relocate existing drive slices of data of existing PUs to other drive slices of the newly added PD. Such distribution may include restriping a PU at a desired target location on the newly added PD. Restriping may include migrating at least one slice of existing data of the PU from a source location on a PD of the existing pool of N PDs to a target location on a PD of the newly added PD. In at least one embodiment, restriping can be triggered in response to adding the one or more new PDs to the existing pool.

Figure 6:
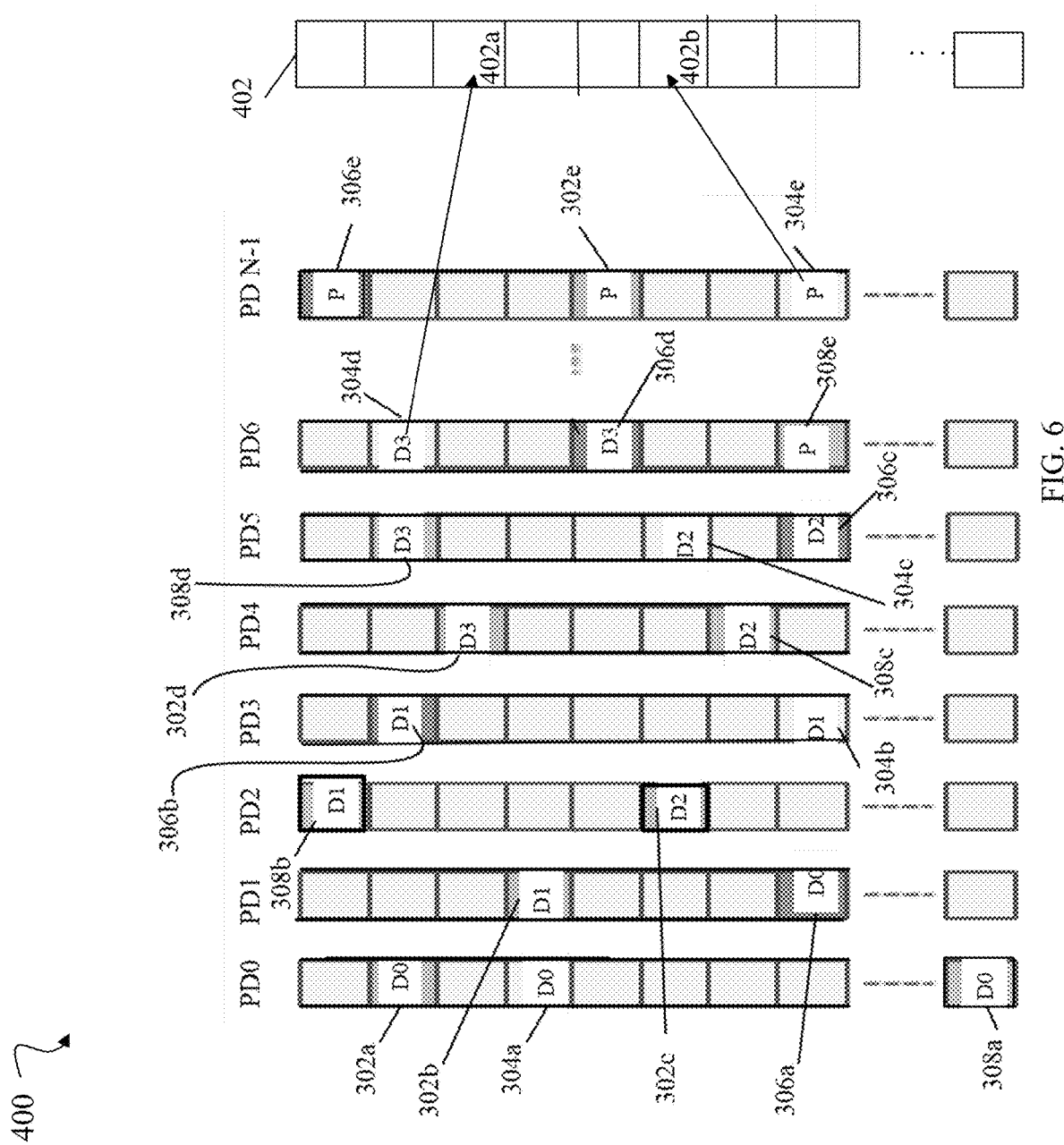

To further illustrate, reference is made to the example 400 of FIG. 6 where the new PD 402 is added to the existing pool of N PDs. The components of FIG. 6 similar to those of FIG. 5A are similarly numbered. Additionally, in the example of FIG. 6, restriping has been triggered to redistribute existing drive slices of configured PUs located on the existing pool of N PDs to the new PD 402. In this example, the slice 304d is selected for movement or relocation to the drive slice 402a of the new PD 402; and the slice 304e is selected for movement or relocation to the drive slice 402b. The relocation or movement of the drive slice 304d can include copying the data from the source slice 304d to the target slice 402a, and after the copying is complete, marking the slice 304d as free or available. The relocation or movement of the drive slice 304e can include copying the data from the source slice 304e to the target slice 402b, and after the copying is complete, marking the slice 304e as free or available.

The slice selected for relocation or movement can be selected in accordance with any suitable criteria. In at least one embodiment, the restriping to relocate existing drive slices to the newly added PD 402 can be performed as a background task. Generally, the particular drive slices selected to store data of configured PUs can have a goal to evenly distribute free slices among the PDs. In this manner, restriping can be triggered more generally in response to a detected level of imbalance in the number of free slices on each of the PDs of the pool. For example, adding a new PD results in all slices (e.g., 100%) of the new PD marked as free. The existing N PDs of the pool may each have approximately the same number of free slices, or approximately the same percentage of free slices, within specified tolerances or limits. For example, assume existing N PDs each have between 30-40% of its slices that are free. In such an embodiment, new PD 402 can be added and detected as having an imbalance since it has 100% of its slices that are free and the other N PDs each have between 30-40% of its slices marked as free.

In at least one embodiment in accordance with the techniques of the present disclosure with mapped RAID and mapped RGs or PUs, the concept of a resiliency set (RS) can be applied. An RS can be defined as a logical grouping of PDs forming a fault or failure domain. PUs or mapped RGs of user data and parity information can be distributed across the PDs of a single RS. Generally, data of a single failed PD in an RS may be recovered or rebuilt using data from one or more other healthy functioning PDs of the same RS. Thus, rather than have a pool of generally N PDs for use in connection with configuring mapped RGs or PUs of one or more RAID levels and configurations, an embodiment can apply the concept of an RS to denote the PDs.

In at least one embodiment, the PDs in the system available for storage capacity can be partitioned into multiple RSs. PUs can be configured within each RS. However, storage capacity allocated for a single PU can be required to be allocated from within a single RS and cannot be allocated from drive slices of multiple RSs. In such an embodiment, the configuration requirements or rules may require that all slices for a single PU come from the same RS, and that slice distribution among all PDs of each RS should be as even as possible. PU drive slices can be written fully consistent within an RS and distributed as evenly as possible across the PDs of the RS. Generally, data of a single failed PD in an RS can be recovered or rebuilt using data from one or more other healthy functioning PDs of the same RS. In at least one embodiment, the RS can include the PDs used for storing user data in accordance with a specified algorithm and configuration providing data protection and redundancy.

In at least one embodiment, the number of PDs included in an RS can be selected and vary in accordance with the particular RAID level and configuration to achieve an expected level of data availability and risk of data loss. Consider, for example, a RAID-5 4+1 group configuration which can tolerate a single drive member failure without a data loss. With a single drive member failure, the RAID-5 RG can perform rebuild processing where the data of the failed single drive can be recovered using data (e.g., user data and/or parity information) of remaining healthy drives of the RG. However, a RAID-5 RG cannot tolerate two simultaneous drive member failures. Thus with RAID-5, two simultaneous drive member failures result in a data loss or data unavailability for the configured RG. Generally, as the number of PDs in an RS increases, the risk or probability of a double drive member failure in a mapped RG or PU of the RS also increases. However, as the number of PDs in an RS increases, the amount of time it takes to rebuild a single failed PD also increases. Thus in at least one embodiment using mapped RAID and PUs, the number of PDs in a single RS can be selected and limited to achieve a desired level of reliability and availability where the number of PDs in a single RS can vary with the RAID level and configuration used for the mapped RAID and configured PUs of the RS. For example, in at least one embodiment, the maximum number of PDs, MAX, allowable for a single RS can be 25, where the RS is used to configure mapped RGs or PUs using RAID-5 in a 4+1 configuration. As another example, in at least one embodiment, the maximum number of PDs, MAX, allowable for a single RS can be 50 where the RS is used to configure mapped RGs or PUs using RAID-6 such as in a 6+2 configuration (e.g., 6 user data drives or members and 2 parity drives of members). In this manner, the mapped RAID concept used to configure mapped RGs or PUs can be applied to a pool of PDs where the pool of PDs is an RS have at least a minimum number of PDs and at most a maximum number of PDs, where the minimum number and maximum number of PDs can be determined in accordance with the RAID-level and configuration.

In at least one embodiment in accordance with the techniques of the present disclosure using RSs, the PDs which are rotating disk drives having capacity for use can be partitioned into multiple RSs each including at least a minimum number of PDs and no more than a specified maximum number of PDs in accordance with the particular RAID configuration and RAID level of the PUs or mapped RGs configured in the RS. If additional PDs are added to an RS so that the total exceeds the specified maximum, such as 25, for the particular RS, the PDs of the RS can be partitioned into multiple RSs so as to conform to the specified minimum and maximum number of PD values. For example, for an RS used with configuring mapped RGs or PUs having a RAID-5 4+1 configuration, the RS can include at least a minimum number of 5 PDs and at most a maximum number of 25 PDs. For example, for an RS used with configured mapped RGs or PUs having a RAID-6 6+2 configuration, the RS can include at least a minimum number of 8 PDs and at most a maximum number of 50 PDs. In this manner, configuration of mapped RGs or PUs as described in connection with FIGS. 5A, 5B and 6 can be performed with respect to the PDs of a single RS.

Additionally, with reference back to FIGS. 5A, 5B and 6, it should be noted that each PD can include a minimum amount of reserved spare capacity. When configuring and allocating storage for new PUs, free slices of the PDs can be consumed. However, in such an embodiment when consuming free slices when configuring new PUs, the amount of free slices on each PD may not be allowed to drop below the minimum amount of reserved spare capacity. In this manner, each PD can have at least the minimum amount of reserved spare capacity which is not consumed or used when configuring new PUs in order to use such reserved spare capacity as spare slices in connection with storing rebuilt slices of one or more failed PDs.

What will now be described are techniques that can be used to layout and configure PUs of mapped RAID configurations on rotating disk drives or HDDs. In such an embodiment, the rotating disk drives or HDDs can be configured into RSs as discussed above.

Consistent with discussion above, rotating disk drives or HDDs have an interesting general characteristic in that the outer tracks have a higher data throughput, bandwidth, and/or data transfer rate than the inner tracks. In an investigation performed by the inventors with rotating disk drives from multiple vendors, the inventors measured the read and write data throughput, bandwidth or data transfer rate of the innermost track and the outermost track. The inventors determined the measured data throughput, bandwidth and/or data transfer rate of the outermost track was generally roughly twice that of the innermost track.

In a system using PUs configured using mapped RAID in an RS, if a PU is configured from slices of both outer tracks and inner tracks, the performance of the PU can be limited by the slower performance of the inner tracks.

Figure 7:
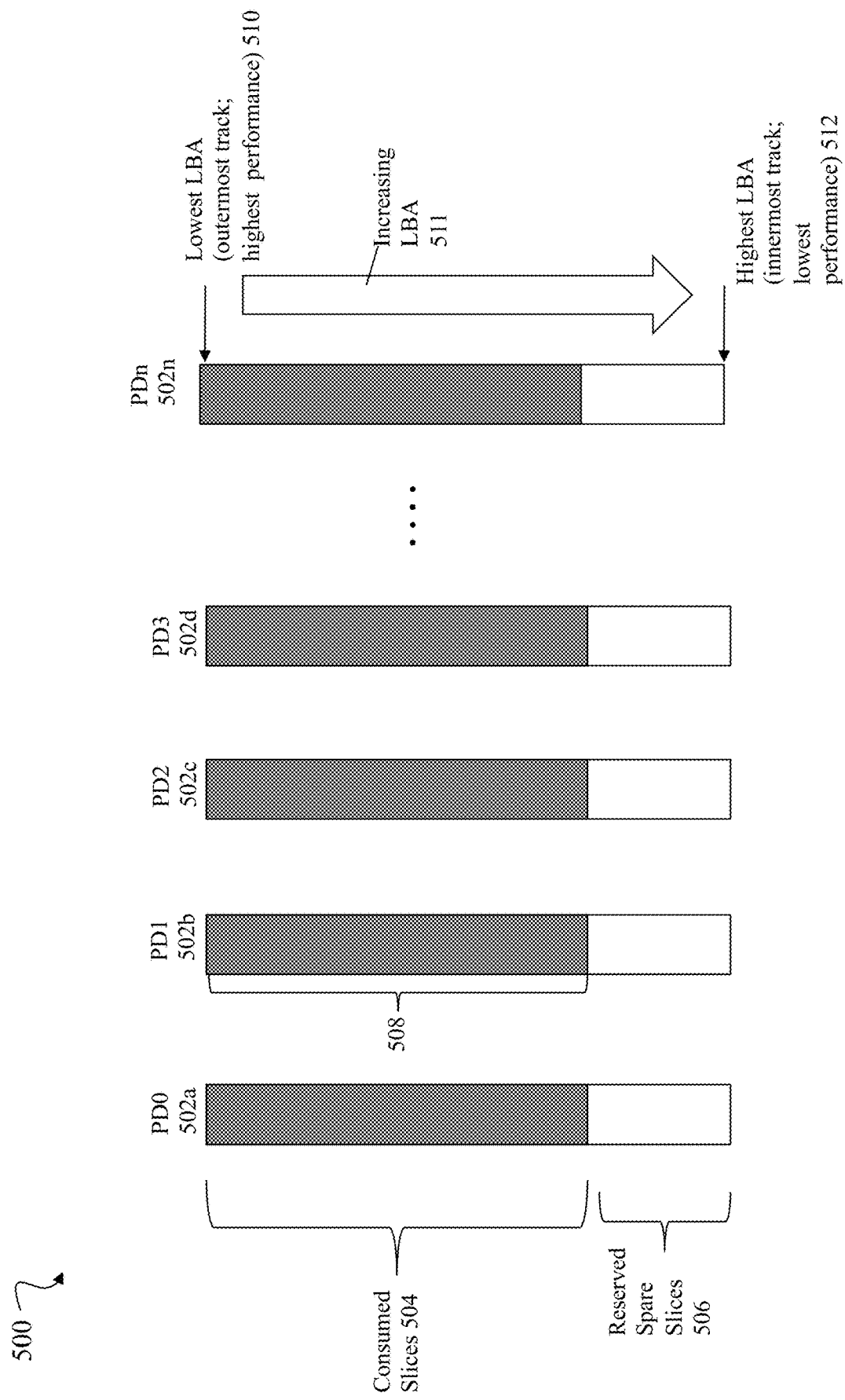

For example, to further illustrate, reference is made to the example 500 of FIG. 7. The example 500 includes the PDs 502a-n that can be included in a single RS used to configure PUs. The PDs 502a-n can be rotating disk drives or HDDs. In at least one existing system, slices can be allocated for newly configured PUs in an order such that slices of the outer tracks having the lowest LBA 510 on the PDs are allocated prior to slices of inner tracks having higher LBAs of the PDs. In this manner, free slices of a PD can be allocated generally in a sequential order from the outermost track 510 to the innermost track 512. The arrow 511 generally denotes the order in which free slices can be allocated from PDs 502a-n from outer tracks to inner tracks. Additionally, the system can reserve an amount of free storage capacity of each PD as reserved spare slices 506. The reserved storage capacity 506 of the PDs 502a-n denotes free slices that are not consumed or used for configuring new PUs but rather reserved for use as spare slices in the event of a PD failure. Based on the sequential order 511 of allocating free slices when forming PUs from the outermost track 510 to the innermost track 512 of the PDs, eventually the reserved spare slices 506 will remain and be located in the highest LBAs or innermost tracks of the PDs. The example 500 of FIG. 7 generally illustrates a state of the PDs 502a-n where all but the reserved spare slices 506 in the lowest performing innermost tracks of the PDs 502a-n have been allocated and configured into PUs. Thus the example 500 illustrates the scenario where the customer runs out of usable storage capacity on the PDs 502a-n of the RS and where the only remaining free capacity is included in the element 506 denoting the free slices of the innermost tracks containing the reserved spare slices.

In connection with the example 500, assume a PD failure occurs for one of the rotating disk drives 502a-n. For example, assume PD1 502b fails such that the element 508 denotes the drive slices having data (e.g., user data and/or parity information) that needs to be rebuilt and relocated to spare slices of other PDs 502a, 502c-502n of the RS. In this case, only the low performance spare slices of 506 from the other PDs 502a and 502c-n are available to replace the failed drive slices 508 and store the rebuilt data of the failed drive slices 508. After rebuilding has completed to recover the data of the drive slices 508 and to store the recovered data on selected spare slices of 506 of the other PDs 502a and 502c-n, at least some existing PUs configured in the RS on the PDs 502a-n can include slices from one or more of the highest performance outermost tracks and also from one or more of the lowest performance innermost tracks. For example, consider an existing PU that includes slices from both the highest performance outermost track of PDs 502a and 502b and also slices from the lowest performance innermost track of the PDs 502c and 502d. The existing PU can experience performance that is limited based on the performance of the slowest or innermost tracks of the PDs 502c, 502d of the configured PU.

Accordingly, in at least one embodiment of the techniques of the present disclosure, a PU can be configured from drive slices have the same or similar performance in that all drive slices of the single PU can have the same or similar data throughput, bandwidth, and/or data transfer rate. In this manner, the drive slices of the single PU can be included in tracks of PDs of the RS having the same or similar data throughput, bandwidth, and/or data transfer rate. In at least one embodiment in accordance with the techniques of the present disclosure, drives slices having the same or similar data throughput, bandwidth, and/or data transfer rate can be selected for the single PU when initially configuring or allocating the PU. In at least one embodiment in accordance with the techniques of the present disclosure, drives slices having the same or similar data throughput, bandwidth, and/or data transfer rate can be selected for the single PU when selecting spare slices for the PU in response to a PD failure. In at least one embodiment in accordance with the techniques of the present disclosure, a target slice having the same or similar data throughput, bandwidth, and/or data transfer rate as an existing source slice can be selected for the single PU when performing restriping that includes relocating data from the existing source slice of the single PU to the target slice.

Consistent with discussion herein, slices within a same performance partition, and more generally the same performance partition tier, can be characterized as having the same or similar performance in terms of data throughput, bandwidth and/or data transfer rate, within specified tolerance limits or allowable differences.

In the following examples and embodiments, the PDs are all rotating disk drives or HDDs.

Figure 8A:
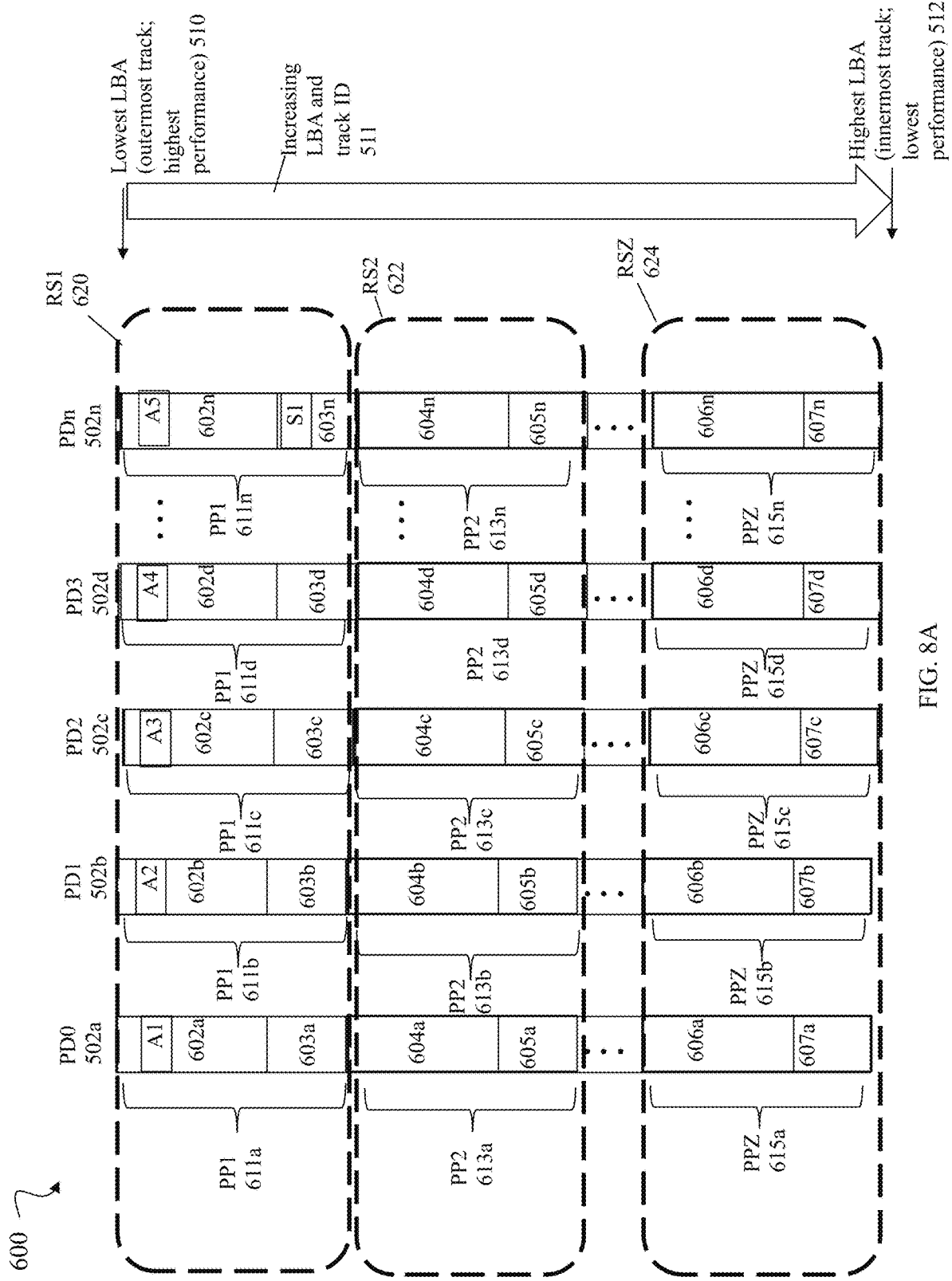
FIGS. 8A, 9A and 9B are examples of mapped RAID configurations of PUs using performance partitions in embodiments in accordance with the techniques of the present disclosure.

Referring to FIG. 8A, shown is an example 600 of an embodiment in accordance with the techniques of the present disclosure.

The example 600 includes PDs 502a-n denoting the entire HDD or rotating disk drive capacity in a system. Generally, each of the PDs 502a-n can be divided into slices each having a same size or storage capacity as discussed above. Additionally, each of the PDs 502a-n can be divided into a plurality of performance partitions or PPs. A PP can denote a logical grouping of sequential contiguous tracks on a PD where slices of the same PP have the same or similar performance with respect to data throughput, bandwidth, and/or data transfer rate, within specified tolerances, limits or differences. As illustrated in the FIG. 8A, each of the PDs 502a-n can be divided into Z PPs. For example, PD 502a includes PP1 611a, PP2 613a, . . . , and PP Z 615a; PD 502b includes PP1 611b, PP2 613b, . . . , and PP Z 615b; PD 502c includes PP1 611c, PP2 613c, . . . , and PP Z 615c; PD 502d includes PP1 611d, PP2 613d, . . . , and PP Z 615d; and PD 502n includes PP1 611n, PP2 613n, . . . , and PP Z 615n.

The element 510 denotes the outermost track having the highest performance of all tracks in terms of data throughput, bandwidth and/or data transfer rate, and the element 512 denotes the innermost track having the lowest highest performance of all tracks in terms of data throughput, bandwidth and/or data transfer rate. Assume that each track of each of the PDs 502a-n has an associated track ID or number assigned from a sequential consecutive integer range from 1 to MAX, with the outermost track have a track ID or number=1 and the innermost track having a track ID or number MAX. The arrow 511 denotes the increasing track ID or number and also LBA on the PDs 502a-n. In this manner, a PP of a PD can correspond to a logical grouping of sequential contiguous tracks on the PD. Collectively, all the PPs of the same PD can correspond to the entire contiguous integer range of track IDs from 1 to MAX. In one aspect, the arrow 511 can denote the contiguous integer range of track IDs or number from 1 to MAX, where 1 denotes the outermost track with the highest performance and MAX denotes the innermost track with the lowest performance.

In at least one embodiment, the tracks and slices included in the same PP or same PP tier can be characterized as having the same or similar performance with respect to data throughput, bandwidth, and/or data transfer rate. Put another way, the tracks and slices included in the same PP or same PP tier can be characterized as having an insubstantial performance difference with respect to data throughput, bandwidth, and/or data transfer rate. An embodiment can define specified tolerances, limits or differences with respect to performance to denote an acceptable or allowable performance difference between slices which are considered the same or similar in terms of performance. Based on such specified tolerances, limits or acceptable differences in performance, tracks and slices thereof having similar performance can be identified and included in the same PP and also included in the same PP tier. The size of each PP, and thus the size of each PP tier, can be subject to the performance difference tolerance level (e.g., acceptable or allowable level of performance difference of slices within the same partition) which can be configurable in an embodiment.

Consistent with discussion above regarding FIG. 8A, each of the PDs 502-n can be partitioned into Z PPs, where each of the Z PPs denotes a different PP level or ranking. The PP levels of the PPs formed from the PDs 502a-n can denote a relative performance ranking of the PPs of the PDs. In the example 600 of FIG. 8A, the PP level can be from 1 to Z, where the lower the PP level, the higher the performance and associated performance ranking. In at least one embodiment, the PPs of the same PP level across the multiple PDs 502a-n can be characterized as forming a performance tier (sometimes also referred to as a PP tier). Thus, the PP levels can denote different performance tiers where each performance tier includes slices of PPs of different PDs. Slices in the same performance tier or PP tier can be characterized as having substantially the same or similar performance with respect to data throughput, bandwidth and/or data transfer rate in a manner as discussed herein with respect to slices of the same PP level. To further illustrate, the PPs 611a-n denote PPs of PP level 1 or PP tier 1 spanning across the PDs 502-n where all slices in PP tier1 have the same or similar performance in terms of data throughput, bandwidth and/or data transfer rate. The PPs 613a-n denote PPs of PP level 2 or PP tier 2 spanning across the PDs 502-n where all slices in PP tier2 have the same or similar performance in terms of data throughput, bandwidth and/or data transfer rate. The PPs 615a-n denote PPs of PP level Z or PP tier Z spanning across the PDs 502-n where all slices in PP tier Z have the same or similar performance in terms of data throughput, bandwidth and/or data transfer rate.

In at least one embodiment, each of the PPs can be the same size or storage capacity, and thus each of the PPs can include the same number of slices. Generally, the PP size is subject to the performance difference tolerance level, which can be configurable. As a variation in another embodiment, the PPs may not all have the same size or storage capacity. In this latter embodiment, the size or storage capacity of PPs can vary, for example, depending on the particular performance difference tolerance level(s) (e.g., acceptable or allowable level of performance difference of slices within the same partition) which can be configurable in an embodiment. Furthermore, in this latter embodiment difference performance tolerance levels can be specified for different PPs and PP tiers.

For simplicity of illustration in connection with FIG. 8A and subsequent examples and embodiments, assume that each of the PPs denotes a same size or storage capacity.

In at least one embodiment, each of the PDs 502a-n can be partitioned into Z PPs, where each of the Z PPs can denote a logical subdrive. Thus, each of the PDs 502a-n can be characterized as having Z subdrives, where each subdrive of the same PD can denote a different PP of the PD.

In at least one embodiment, the concepts of RSs, PUs or mapped RGs, spares, and rebuilding (e.g., with respect to rebuilds for mapped RGs) and restriping can be applied and integrated with PPs and PP tiers.

In at least one embodiment, RSs can be configured from subdrives or PPs across multiple PDs of the same PP level or PP tier. Each RS can generally include PPs or subdrives of the same PP level across multiple PDs. For example, RS1 620 can be configured from subdrives or the PPs 611a-n of PP level 1; RS2 622 can be configured from subdrives or the PPs 613a-n of PP level 2; and RSZ 624 can be configured from subdrives or the PPs 615a-m of PP level Z. In this manner, the RSs can include and manage logical subdrives or PPs of the same PP level or PP tier rather than include and manage entire PDs. The subdrives or PPs included in the same RS can belong to the same PP level or PP tier.

In at least one embodiment of FIG. 8A, each RS can include its own reserved spare slices or capacity for use in connection with only that particular RS. In at least one embodiment, a specified amount of storage capacity of each PP of an RS can be reserved as spare storage capacity including spare slices for use with only the RS. For example, the elements 603a-n of the PPs 611a-n can denote the reserved spare storage capacity of spare slices for use with only RS1 620; the elements 605a-n of the PPs 613a-n can denote the reserved spare storage capacity of spare slices for use with only RS2 622; and the elements 607a-n of the PPs 615a-n can denote the reserved spare storage capacity of spare slices for use with only RS Z 624.

The collective storage capacity denoted by 602a-n can denote the storage capacity of slices used for PU allocation for PUs configured from RS1 620. The collective storage capacity denoted by 604a-n can denote the storage capacity of slices used for PU allocation for PUs configured from RS2 622. The collective storage capacity denoted by 606a-n can denote the storage capacity of slices used for PU allocation for PUs configured from RSZ 624.

In this manner, algorithms as described herein for PU configuration and allocation, use of spares, rebuilding and restriping can be used and applied with respect to RSs configured using PPs. In particular in at least one embodiment, each RS as illustrated in FIG. 8A can have its own reserved spare slice storage capacity that can be used to store reconstructed or rebuilt data of an existing slice included in a failed PD. For example, assume PD0 502a fails and that there is a first PU configured from multiple slices of RS1 620, where the first PU is configured from the slices A1-A5, respectively, of 602*a-d* and 602*n*. In this example, RS1 620 can include 5 subdrives or PPs 611*a-d* and 611*n* used for configuring PUs as mapped RGs having a RAID-5 4+1 configuration. Thus, user data can be stored in PUs, such as the first PU, in accordance with a RAID algorithm for the RAID level and configuration associated with RS1 620. The first PU can denote a mapped RG based on the RAID-5 4+1 configuration, where data of the first slice A1 of 602*a* can be reconstructed using a RG rebuild algorithm in accordance with the particular RAID level and configuration (e.g., RAID-5 with a 4+1 configuration) of the mapped RG of the first PU. Once the data (e.g., user data or parity information) of the first slice A1 of 602*a* is reconstructed, it can be stored on a spare slice selected from the reserved spare capacity 603*a-n* of RS1 620. For example, S1 can denote the spare slice of 603*n* selected for storing the reconstructed data of the slice A1. In this case, each single RS can have its own spare slice capacity used only for spare slices with the single RS. The spare slices of 603*a-n* of RS1 620 have the same or similar performance as other slices of the storage capacity 602*a-n* used for configured PUs so that use of the spare slices of RS1 from 603*a-n* for storing reconstructed data does not result in overall decrease or limit in performance for the configured first PU.

Figure 8B:
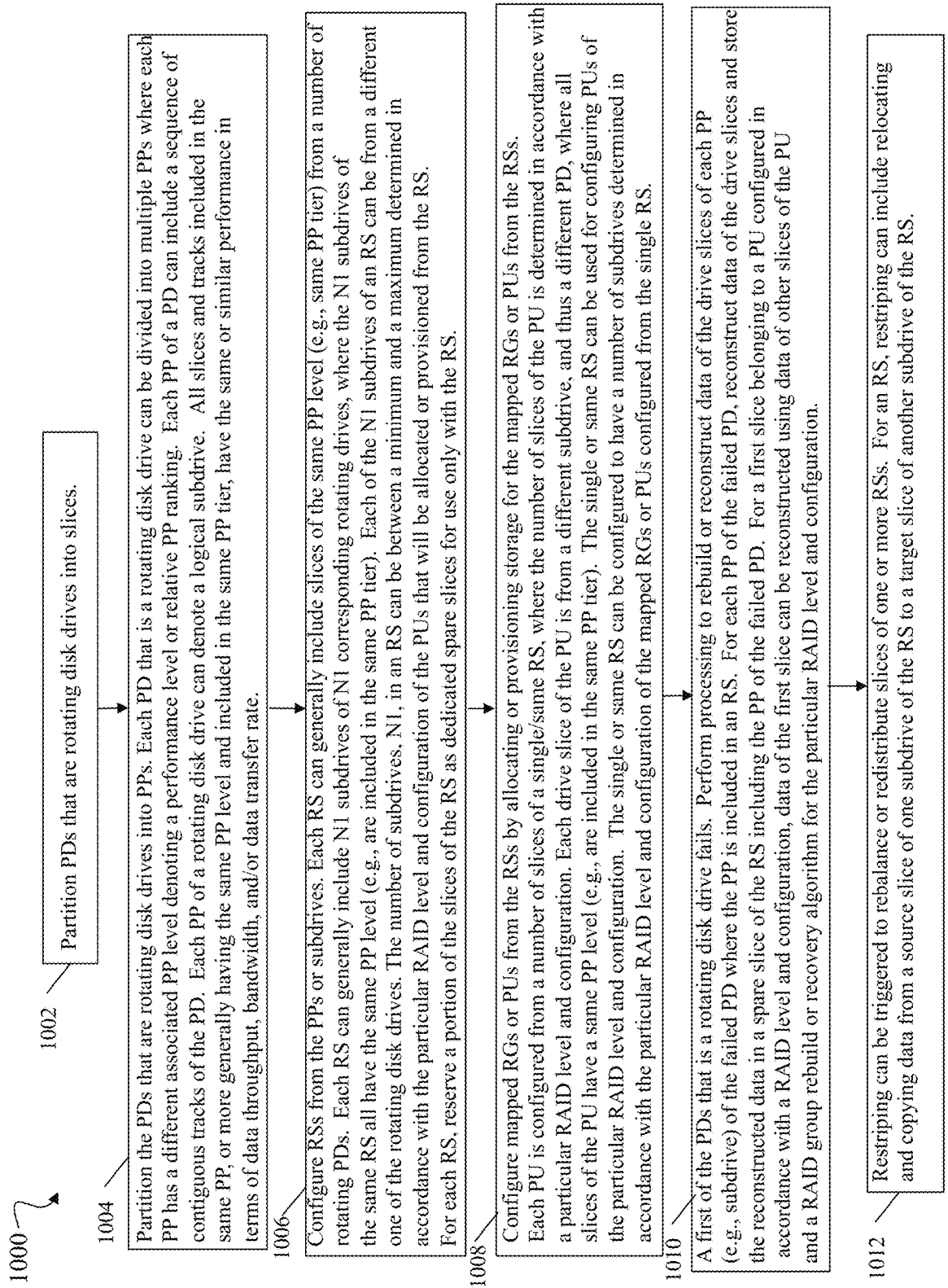
FIGS. 8B and 9C are flowcharts of processing steps that can be performed in embodiments in accordance with the techniques of the present disclosure.

Referring to FIG. 8B, shown is a flowchart of processing steps that can be performed in an embodiment in accordance with the techniques of the present disclosure. In particular, the steps of the flowchart 1000 can be performed in connection with an embodiment in accordance with the arrangement described in connection with FIG. 8A.

At the step 1002, the PDs that are rotating disk drives can be partitioned into slices. Each of the slices can be a same size denoting the same storage capacity. From the step 1002, control proceeds to the step 1004.

At the step 1004, the PDs that are rotating disk drives can be partitioned into PPs. Each PD that is a rotating disk drive can be divided into multiple PPs, where each PP has a different associated PP level denoting a performance level, PP tier or relative PP ranking. Each PP of a PD can include a sequence of contiguous tracks of the PD. Each PP of a rotating disk drive can denote a logical subdrive. All slices and tracks included in the same PP, or more generally having the same PP level and included in the same PP tier, have the same or similar performance in terms of data throughput, bandwidth, and/or data transfer rate. From the step 1004, control proceeds to the step 1006.

At the step 1006, one or more RSs can be configured from the PPs or subdrives. Each RS can generally include slices of the same PP level (e.g., same PP tier) from a number of rotating PDs. Each RS can generally include N1 subdrives of N1 corresponding rotating drives, where the N1 subdrives of the same RS all have the same PP level (e.g., are included in the same PP tier). Each of the N1 subdrives of an RS can be from a different one of the rotating disk drives. The number of subdrives, N1, in an RS can be between a minimum and a maximum determined in accordance with the particular RAID level and configuration of the PUs that will be allocated or provisioned from the RS. For each RS, reserve a portion of the slices of the RS as dedicated spare slices for use only with the RS. For example, assume an RS such as RS1 620 is used to configure and allocate slices for PUs or mapped RGs having a RAID-5 level with a 4+1 configuration. In this case, the minimum number of subdrives of the RS1 620 is 5 and the maximum number of subdrives can be 25. Generally, RS1 620 can include any number of subdrives from the inclusive range from 5-25. As another example, assume an RS such as RS2 622 is used to configure and allocate slices for PUs or mapped RGs having a RAID-6 level with a 6+2 configuration. In this case, the minimum number of subdrives of the RS2 622 is 8 and the maximum number of subdrives can be 50. Generally, RS1 620 can include any number of subdrives from the inclusive range from 8-50. In at least one embodiment, the maximum number can be determined as discussed elsewhere herein in accordance with the particular RAID level and configuration of PUs configured from the RS to achieve an expected level of data availability and risk of data loss. From the step 1006, control proceeds to the step 1008.

At the step 1008, processing can be performed to configure mapped RGs or PUs from the RSs by allocating or provisioning storage for the mapped RGs or PUs from the RSs. Each PU can be configured from a number of slices of a single RS (e.g., the same RS), where the number of slices of the PU is determined in accordance with a particular RAID level and configuration. Each drive slice of the PU is from a different subdrive, and thus a different PD, where all slices of the PU have a same PP level (e.g., are included in the same PP tier). The single or same RS can be used for configuring PUs of the particular RAID level and configuration. The single or same RS can be configured to have a number of subdrives determined in accordance with the particular RAID level and configuration of the mapped RGs or PUs configured from the single RS. From the step 1008, control proceeds to the step 1010.

At the step 1010, a first of the PDs that is a rotating disk drive fails. The step 1010 can include performing processing to rebuild or reconstruct data of the drive slices of each PP (e.g., subdrive) of the failed PD where the PP is included in an RS. For each PP of the failed PD, reconstruct data of the drive slices and store the reconstructed data in a spare slice of the RS including the PP of the failed PD. For a first slice belonging to a PU configured in accordance with a RAID level and configuration, data of the first slice can be reconstructed using data of other slices of the PU and a RAID group rebuild or recovery algorithm for the particular RAID level and configuration. From the step 1010, control proceeds to the step 1012.

At the step 1012, restriping can be triggered, for example, to rebalance or redistribute slices of one or more RSs. Consistent with discussion elsewhere herein, the restriping can be triggered in response to any one or more defined conditions occurring such as, for example, in response to adding a new rotating disk drive to the system. In this case, the new PD can be divided into slices and PPs or subdrives where the subdrives of the new PD can be added or included in the existing RSs and/or used in configuring one or more new additional RSs. For an RS, restriping can generally include relocating and copying data from a source slice of one subdrive of the RS to a target slice of another subdrive of the RS.

In the embodiment described in connection with FIGS. 8A and 8B, reserved storage capacity for spare slices is included in each of the RSs. In some cases, it may not be desirable to have reserved spare slices of the highest/higher PP tiers since such spare slices generally remain unused unless and until they are consumed as spare slices.

As an alternative to the embodiment described in connection with FIGS. 8A and 8B, an embodiment can reserve storage capacity for spare slices from one or more of the lowest performance PP tiers (e.g., formed from slices of the innermost tracks of the PDs). In such an alternative embodiment, PUs or mapped RGs can initially be allocated from the same PP tier in a manner as discussed above in connection with FIG. 8A. It is only when spare slices are needed, such as in connection with rebuilding or reconstructed data of slices of a failed PD, that reconstructed data is stored on spare slices of the lowest performance PP tiers. In this alternative embodiment, once the failed PD is replaced by a new PD, processing can be performed using restriping to restore (e.g., copy) the spare slices containing the failed PD's data to the new PD. The new PD can be configured to have the same original layout as the failed PD prior to failure. In this manner, the restored data of the spare slices can be copied to target slices of the new PD, where the target slices can have physical locations corresponding to those of the failed PD in accordance with the original layout.

An example of the above-noted alternative embodiment is described below in more detail in connection with FIG. 9A.

Figure 9A:
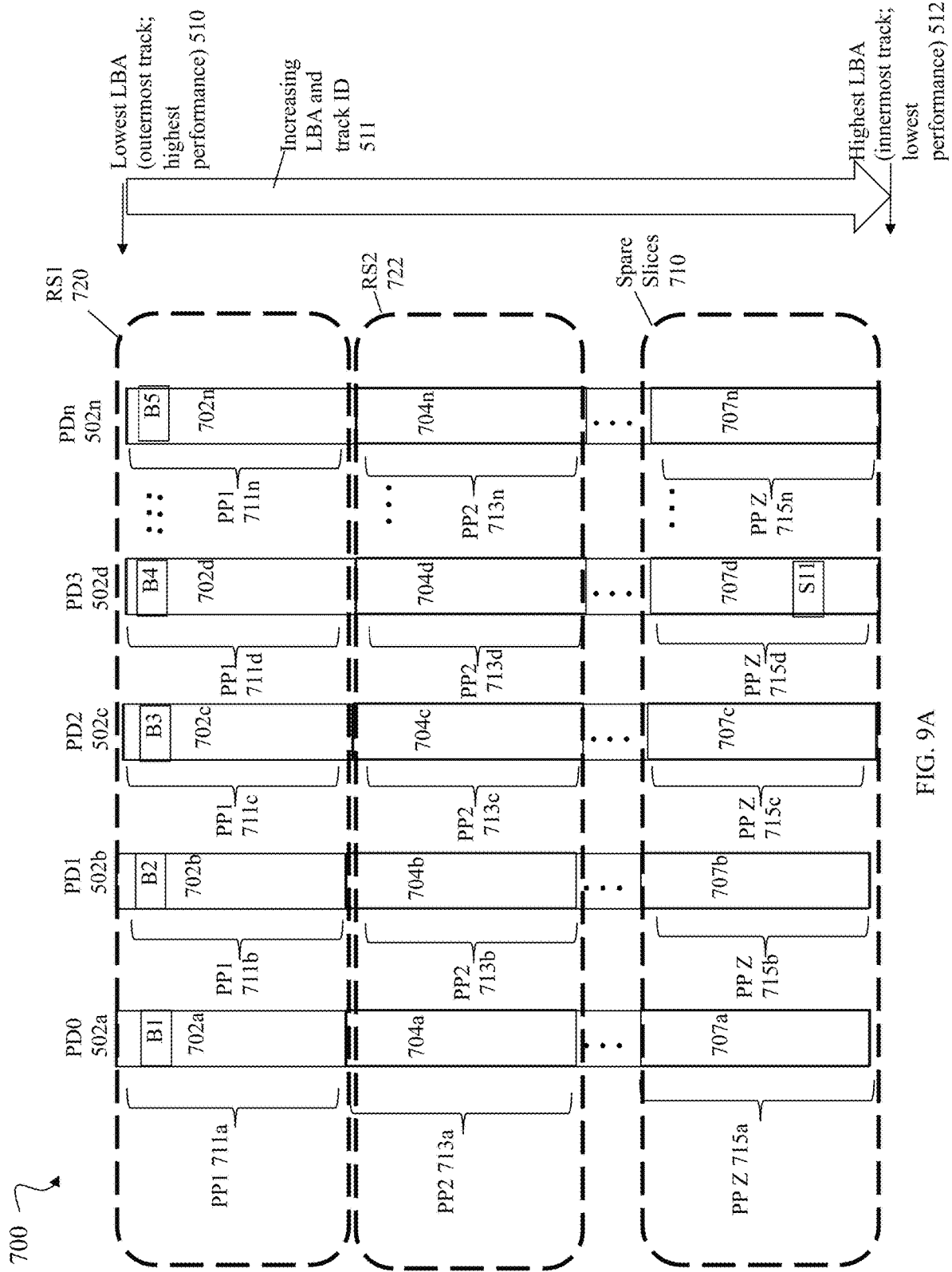

Referring to FIG. 9A, shown is an example 700 of another embodiment in accordance with the techniques of the present disclosure.

The example 700 includes PDs 502a-n denoting the entire HDD or rotating disk drive capacity in a system. Generally, each of the PDs 502a-n can be divided into slices each having a same size or storage capacity as discussed above. Additionally, each of the PDs 502a-n can be divided into a plurality of PPs. As illustrated in the FIG. 9A, each of the PDs 502a-n can be divided into Z PPs. For example, PD 502a includes PP1 711a, PP2 713a, . . . , and PP Z 715a; PD 502b includes PP1 711b, PP2 713b, . . . , and PP Z 715b; PD 502c includes PP1 711c, PP2 713c, . . . , and PP Z 715c; PD 502d includes PP1 711d, PP2 713d, . . . , and PP Z 715d; and PD 502n includes PP1 711n, PP2 713n, . . . , and PP Z 715n.

The elements 510, 511 and 512 are as discussed above in FIG. 8A.

Consistent with discussion above, each of the PDs 502-n of FIG. 9A can be partitioned into Z PPs, where each of the Z PPs denotes a different PP level or ranking. The PP levels of the PPs formed from the PDs 502a-n can denote a relative performance ranking of the PPs of the PDs. In the example 700 of FIG. 9A, the PP level can be from 1 to Z, where the lower the PP level, the higher the performance and associated performance ranking. In at least one embodiment, the PPs of the same PP level across the multiple PDs 502a-n can be characterized as forming a performance tier (sometimes also referred to as a PP tier). Thus, the PP levels can denote different performance tiers where each performance tier includes slices of PPs of different PDs. Slices in the same performance tier or PP tier can be characterized as having substantially the same or similar performance with respect to data throughput, bandwidth and/or data transfer rate in a manner as discussed herein with respect to slices of the same PP level. To further illustrate, the PPs 711a-n denote PPs of PP level 1 or PP tier 1 spanning across the PDs 502-n where all slices in PP tier1 have the same or similar performance in terms of data throughput, bandwidth and/or data transfer rate. The PPs 713a-n denote PPs of PP level 2 or PP tier 2 spanning across the PDs 502-n where all slices in PP tier2 have the same or similar performance in terms of data throughput, bandwidth and/or data transfer rate. The PPs 715a-n denote PPs of PP level Z or PP tier Z spanning across the PDs 502-n where all slices in PP tier Z have the same or similar performance in terms of data throughput, bandwidth and/or data transfer rate.

In at least one embodiment, each of the PPs can be the same size or storage capacity, and thus each of the PPs can include the same number of slices. Generally, the PP size is subject to the performance difference tolerance level, which can be configurable. As a variation in another embodiment, the PPs may not all have the same size or storage capacity. In this latter embodiment, the size or storage capacity of PPs can vary, for example, depending on the particular performance difference tolerance level(s) (e.g., acceptable or allowable level of performance difference of slices within the same partition) which can be configurable in an embodiment. Furthermore, in this latter embodiment difference performance tolerance levels can be specified for different PPs and PP tiers.

In at least one embodiment, each of the PDs 502a-n can be partitioned into Z PPs, where each of the Z PPs can denote a logical subdrive. Thus, each of the PDs 502a-n can be characterized as having Z subdrives, where each subdrive of the same PD can denote a different PP of the PD.

In at least one embodiment, the concepts of RSs, PUs or mapped RGs, spares, and rebuilding (e.g., with respect to rebuilds for mapped RGs) and restriping can be applied and integrated with PPs and PP tiers.

In at least one embodiment, RSs can be configured from subdrives or PPs across multiple PDs of the same PP level or PP tier. Each RS can generally include PPs or subdrives of the same PP level across multiple PDs. For example, RS1 720 can be configured from subdrives or the PPs 711a-n of PP level 1; and RS2 722 can be configured from subdrives or the PPs 713a-n of PP level 2. In this manner, the RSs can include and manage logical subdrives or PPs of the same PP level or PP tier rather than include and manage entire PDs. The subdrives or PPs included in the same RS can belong to the same PP level or PP tier.

In at least one embodiment of FIG. 9A, the PP tier Z 710 can be designated as the reserved storage capacity for spare slices. Spare slices of 710 can be used as spare slices in connection with any of the RSs, such as the RSs 720 and 722.

The collective storage capacity denoted by 702a-n can denote the storage capacity of slices used for PU allocation for PUs configured from RS1 720. The collective storage capacity denoted by 704a-n can denote the storage capacity of slices used for PU allocation for PUs configured from RS2 722. The collective storage capacity denoted by 707a-n can denote the storage capacity of spare slices 710.

In this manner, algorithms as described herein for PU configuration and allocation, use of spares, rebuilding and restriping can be used and applied with respect to RSs configured using PPs. In particular in at least one embodiment, spare slices from 710 of FIG. 9A can be used to store reconstructed or rebuilt data of an existing slice included in a failed PD. For example, assume PD0 502a fails and that there is a first PU configured from multiple slices of RS1 720, where the first PU is configured from the slices B1-B5, respectively, of 702a-d and 702n. In this example, RS1 720 can include 5 subdrives or PPs 711a-d and 711n used for configuring PUs as mapped RGs having a RAID-5 4+1 configuration. Thus, user data can be stored in PUs, such as the first PU, in accordance with a RAID algorithm for the RAID level and configuration associated with RS1 720. The first PU can denote a mapped RG based on the RAID-5 4+1 configuration, where data of the first slice B1 of 702a can be reconstructed using a RG rebuild algorithm in accordance with the particular RAID level and configuration (e.g., RAID-5 with a 4+1 configuration) of the mapped RG of the first PU. Once the data (e.g., user data or parity information) of the first slice B1 of 702a is reconstructed, it can be stored on a spare slice selected from the reserved spare capacity 707a-n of the spare slice capacity 710. For example, S11 of 707d can denote the spare slice of 710 selected for storing the reconstructed data of the slice B1. Sometime later, the failed PD 502*a* can be replaced with a new PD. The original failed PD 502*a* may have had an original layout or arrangement of slices of configured PUs. Once the new PD is added so as to replace the failed PD 502*a*, data from spare slices of 710 use to store reconstructed slices of the failed PD 502*a* can be copied to the new PD in accordance with the original layout of the failed PD 502*a*.

It should be noted that although FIG. 9A illustrates a single PP tier Z reserved as spare slice capacity, more generally, an embodiment can reserve one or more PP tiers of storage capacity for spare slices. Also, although one or more entire PP tiers can be marked as reserved for spare slice capacity, an embodiment can alternatively reserve spare slice capacity from one or more PP tiers without designating an entire PP tier as reserved as illustrated in FIG. 9B.

Figure 9B:
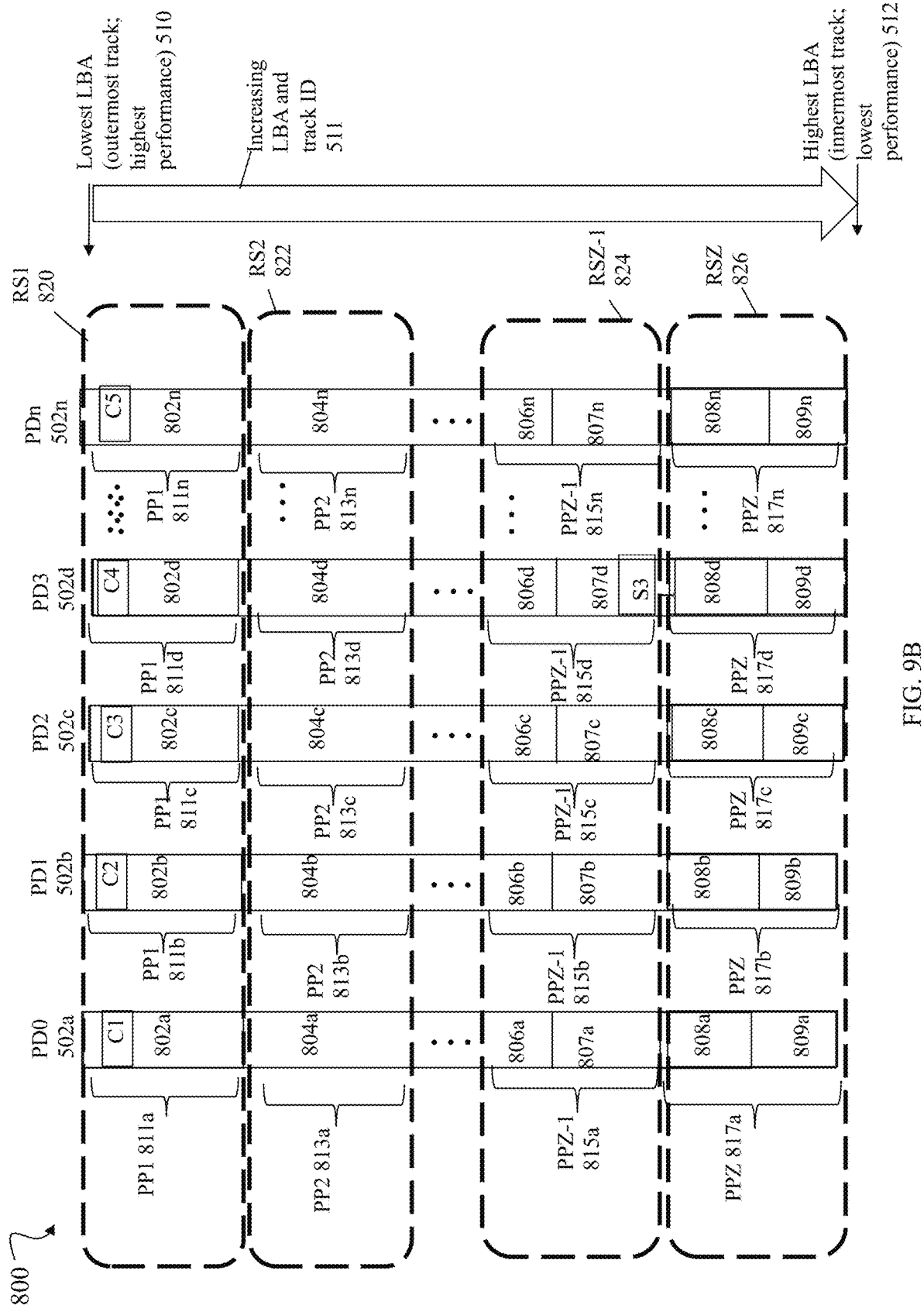

Referring to FIG. 9B, shown is an example 800 of another embodiment in accordance with the techniques of the present disclosure.

The example 800 includes PDs 502*a-n* denoting the entire HDD or rotating disk drive capacity in a system. Generally, each of the PDs 502*a-n* can be divided into slices each having a same size or storage capacity as discussed above. Additionally, each of the PDs 502*a-n* can be divided into a plurality of PPs. As illustrated in the FIG. 9B, each of the PDs 502*a-n* can be divided into Z PPs. For example, PD 502*a* includes PP1 811*a*, PP2 813*a*, . . . ,PPZ-1 815*a* and PP Z 817*a*; PD 502*b* includes PP1 811*b*, PP2 783*b*, . . . , PP Z-1 815*b*, and PP Z 817*b*; PD 502*c* includes PP1 811*c*, PP2 813*c*, . . . , PP Z-1 815*c*, and PP Z 817*c*; PD 502*d* includes PP1 811*d*, PP2 813*d*, . . . , PP Z-1 815*d* and PP Z 817*d*; and PD 502*n* includes PP1 811*n*, PP2 813*n*, . . . , PP Z-1 815*n*, and PP Z 817*n*.

The elements 510, 511 and 512 are as discussed above in FIG. 8A.

Consistent with discussion above, each of the PDs 502-*n* of FIG. 9B can be partitioned into Z PPs, where each of the Z PPs denotes a different PP level or ranking. The PP levels of the PPs formed from the PDs 502*a-n* can denote a relative performance ranking of the PPs of the PDs. In the example 800 of FIG. 9B, the PP level can be from 1 to Z, where the lower the PP level, the higher the performance and associated performance ranking. In at least one embodiment, the PPs of the same PP level across the multiple PDs 502*a-n* can be characterized as forming a performance tier (sometimes also referred to as a PP tier). Thus, the PP levels can denote different performance tiers where each performance tier includes slices of PPs of different PDs. Slices in the same performance tier or PP tier can be characterized as having substantially the same or similar performance with respect to data throughput, bandwidth and/or data transfer rate in a manner as discussed herein with respect to slices of the same PP level. To further illustrate, the PPs 811*a-n* denote PPs of PP level 1 or PP tier 1 spanning across the PDs 502-*n* where all slices in PP tier1 have the same or similar performance in terms of data throughput, bandwidth and/or data transfer rate. The PPs 813*a-n* denote PPs of PP level 2 or PP tier 2 spanning across the PDs 502-*n* where all slices in PP tier2 have the same or similar performance in terms of data throughput, bandwidth and/or data transfer rate. The PPs 815*a-n* denote PPs of PP level Z-1 or PP tier Z-1 spanning across the PDs 502-*n* where all slices in PP tier Z-1 have the same or similar performance in terms of data throughput, bandwidth and/or data transfer rate. The PPs 817*a-n* denote PPs of PP level Z or PP tier Z spanning across the PDs 502-*n* where all slices in PP tier Z have the same or similar performance in terms of data throughput, bandwidth and/or data transfer rate.

In at least one embodiment, each of the PPs can be the same size or storage capacity, and thus each of the PPs can include the same number of slices. Generally, the PP size is subject to the performance difference tolerance level, which can be configurable. As a variation in another embodiment, the PPs may not all have the same size or storage capacity. In this latter embodiment, the size or storage capacity of PPs can vary, for example, depending on the particular performance difference tolerance level(s) (e.g., acceptable or allowable level of performance difference of slices within the same partition) which can be configurable in an embodiment. Furthermore, in this latter embodiment difference performance tolerance levels can be specified for different PPs and PP tiers.

In at least one embodiment, each of the PDs 502*a-n* can be partitioned into Z PPs, where each of the Z PPs can denote a logical subdrive. Thus, each of the PDs 502*a-n* can be characterized as having Z subdrives, where each subdrive of the same PD can denote a different PP of the PD.

In at least one embodiment of FIG. 9B, the concepts of RSs, PUs or mapped RGs, spares, and rebuilding (e.g., with respect to rebuilds for mapped RGs) and restriping can be applied and integrated with PPs and PP tiers.

In at least one embodiment of FIG. 9B, RSs can be configured from subdrives or PPs across multiple PDs of the same PP level or PP tier. Each RS can generally include PPs or subdrives of the same PP level across multiple PDs. For example, RS1 820 can be configured from subdrives or the PPs 811*a-n* of PP level 1; RS2 822 can be configured from subdrives or the PPs 813*a-n* of PP level 2; RS Z-1 824 can be configured from subdrives or the PPs 815*a-n*; and RS Z 826 can be configured from subdrives of the PPs 817*a-n*. In this manner, the RSs can include and manage logical subdrives or PPs of the same PP level or PP tier rather than include and manage entire PDs. The subdrives or PPs included in the same RS can belong to the same PP level or PP tier.

In at least one embodiment of FIG. 9B, portions of the PP tiers Z-1 and Z can be designated as the reserved storage capacity for spare slices for use in connection with any of the RSs, such as the RSs 820, 822, 824 and 826.

The collective storage capacity denoted by 802*a-n* can denote the storage capacity of slices used for PU allocation for PUs configured from RS1 820. The collective storage capacity denoted by 804*a-n* can denote the storage capacity of slices used for PU allocation for PUs configured from RS2 822. The collective storage capacity denoted by 806*a-n* can denote the storage capacity of slices used for PU allocation for PUs configured from RS Z-1 824. The collective storage capacity denoted by 808*a-n* can denote the storage capacity of slices used for PU allocation for PUs configured from RS Z 826. The collective storage capacity denoted by 807*a-n* and also 809*a-n* can denote the storage capacity of spare slices for use in connection with any of the RSs, such as the RSs 820, 822, 824 and 826.

In this manner, algorithms as described herein for PU configuration and allocation, use of spares, rebuilding and restriping can be used and applied with respect to RSs configured using PPs. In particular in at least one embodiment, spare slices from 807*a-n* and 809*a-n* of FIG. 9B can be used to store reconstructed or rebuilt data of an existing slice included in a failed PD. For example, assume PD0 502*a* fails and that there is a first PU configured from multiple slices of RS1 720, where the first PU is configured from the slices C1-C5, respectively, of 802*a-d* and 802*n*. In this example, RS1 820 can include 5 subdrives or PPs 811*a-d* and 811*n* used for configuring PUs as mapped RGs having a RAID-5 4+1 configuration. Thus, user data can be stored in PUs, such as the first PU, in accordance with a RAID algorithm for the RAID level and configuration associated with RS1 820. The first PU can denote a mapped RG based on the RAID-5 4+1 configuration, where data of the first slice C1 of 802a can be reconstructed using a RG rebuild algorithm in accordance with the particular RAID level and configuration (e.g., RAID-5 with a 4+1 configuration) of the mapped RG of the first PU. Once the data (e.g., user data or parity information) of the first slice C1 of 802a is reconstructed, it can be stored on a spare slice selected from the reserved spare capacity 807a-n and 809a-n. For example, S3 of 807d can denote the spare slice selected for storing the reconstructed data of the slice C1. Sometime later, the failed PD 502a can be replaced with a new PD. The original failed PD 502a may have had an original layout or arrangement of slices of configured PUs. Once the new PD is added so as to replace the failed PD 502a, data from spare slices of the reserved spare capacity 807a-n and 809a-n use to store reconstructed slices of the failed PD 502a can be copied to the new PD in accordance with the original layout of the failed PD 502a.

Figure 9C:
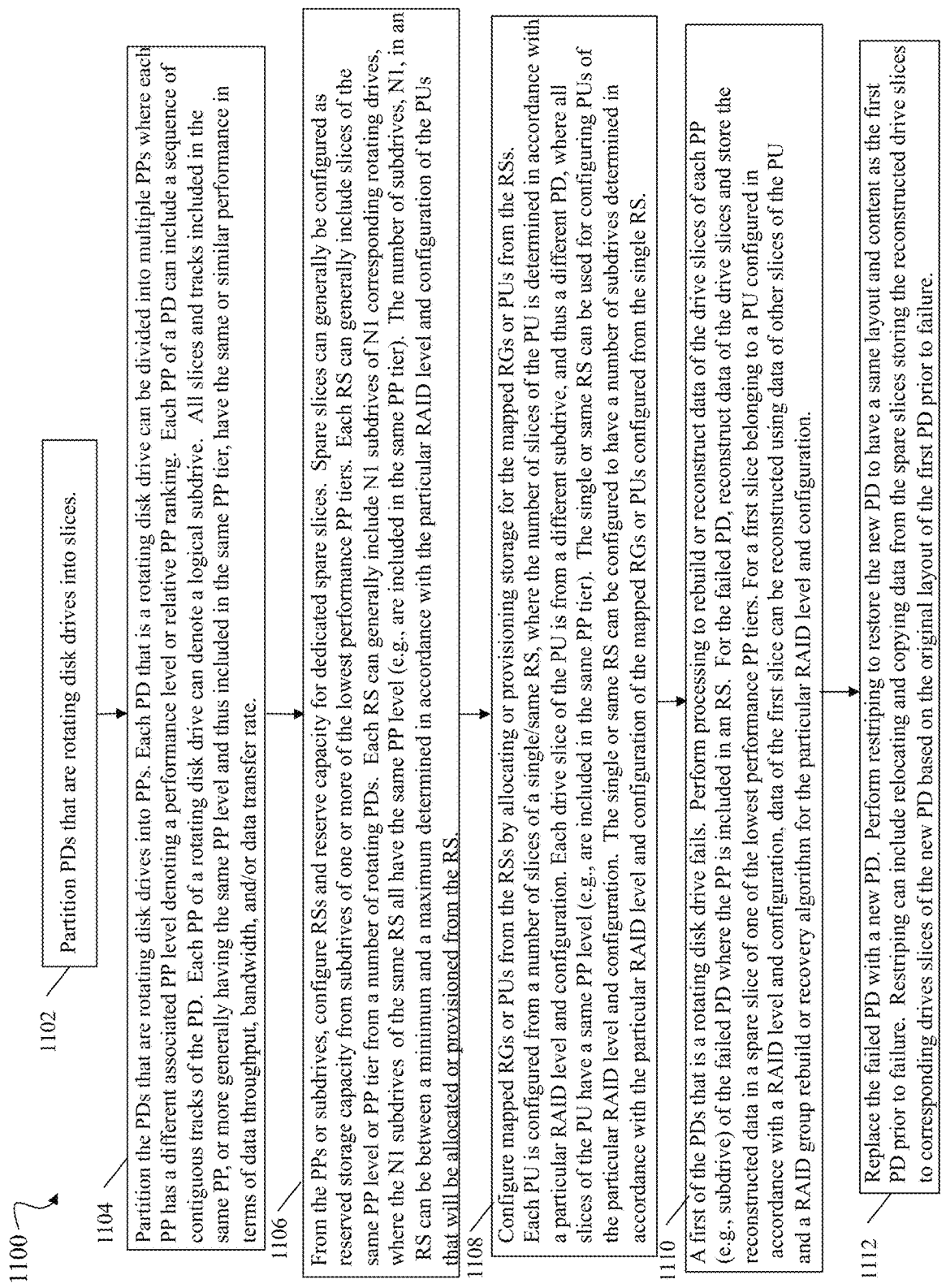

Referring to FIG. 9C, shown is a flowchart 1100 of processing steps that can be performed in an embodiment in accordance with the techniques of the present disclosure. Generally, the steps of the flowchart 1100 summarize processing that can be performed in connection with an embodiment as discussed in connection with FIGS. 9A and 9C where storage capacity is reserved in one or more of the lowest performance PP tiers for spare slices, and where such spare slices can generally be used in connection with any configured RS.

At the step 1102, the PDs that are rotating disk drives can be partitioned into slices each having a same size of storage capacity. From the step 1102, control proceeds to the step 1104.

At the step 1104, processing can be performed to partition the PDs that are rotating disk drives into PPs. Each PD that is a rotating disk drive can be divided into multiple PPs where each PP has a different associated PP level denoting a performance level or relative PP ranking. Each PP of a PD can include a sequence of contiguous tracks of the PD. Each PP of a rotating disk drive can denote a logical subdrive. All slices and tracks included in the same PP, or more generally having the same PP level and thus included in the same PP tier, have the same or similar performance in terms of data throughput, bandwidth, and/or data transfer rate. From the step 1104, control proceeds to the step 1106.

At the step 1106, from the PPs or subdrives, processing can be performed to configure RSs and reserve capacity for spare slices. Spare slices can generally be configured as reserved storage capacity from subdrives of one or more of the lowest performance PP tiers. Each RS can generally include slices of the same PP level or PP tier from a number of rotating PDs. Each RS can generally include N1 subdrives of N1 corresponding rotating drives, where the N1 subdrives of the same RS all have the same PP level (e.g., are included in the same PP tier). The number of subdrives, N1, in an RS can be between a minimum and a maximum determined in accordance with the particular RAID level and configuration of the PUs that will be allocated or provisioned from the RS. The minimum and maximum denoting the bounds of N1 can be as discussed above, for example, in connection with the step 1006 of FIG. 8B. From the step 1106, control proceeds to the step 1108.

At the step 1108, processing can be performed to configure mapped RGs or PUs from the RSs by allocating or provisioning storage for the mapped RGs or PUs from the RSs. Each PU is configured from a number of slices of a single/same RS, where the number of slices of the PU is determined in accordance with a particular RAID level and configuration. Each drive slice of the PU is from a different subdrive, and thus a different PD, where all slices of the PU have a same PP level (e.g., are included in the same PP tier). The single or same RS can be used for configuring PUs of the particular RAID level and configuration. The single or same RS can be configured to have a number of subdrives determined in accordance with the particular RAID level and configuration of the mapped RGs or PUs configured from the single RS. The step 1108 is similar to the step 1008 of FIG. 8B discussed above. From the step 1108, control proceeds to the step 1110.

At the step 1110, a first of the PDs that is a rotating disk drive fails. The step 1110 can include performing processing to rebuild or reconstruct data of the drive slices of each PP (e.g., subdrive) of the failed PD where the PP is included in an RS. For the failed PD, reconstruct data of the drive slices and store the reconstructed data in a spare slice of the reserved capacity of one of the lowest performance PP tiers. For a first slice belonging to a PU configured in accordance with a RAID level and configuration, data of the first slice can be reconstructed using data of other slices of the PU and a RAID group rebuild or recovery algorithm for the particular RAID level and configuration. From the step 1110, control proceeds to the step 1112.

At the step 1112, the failed PD can be replaced with a new PD. The step 1112 can include performing restriping to restore the new PD to have a same layout and content as the first PD prior to failure. Restriping can include relocating and copying data from the spare slices storing the reconstructed drive slices to corresponding drives slices of the new PD based on the original layout of the first PD prior to failure.

The techniques described in the present disclosure can be performed by any suitable hardware and/or software. For example, techniques herein can be performed by executing code which is stored on any one or more different forms of computer-readable media, where the code is executed by one or more processors, for example, such as processors of a computer or other system, an ASIC (application specific integrated circuit), and the like. Computer-readable media includes different forms of volatile (e.g., RAM) and non-volatile (e.g., ROM, flash memory, magnetic or optical disks, or tape) storage, where such storage includes be removable and non-removable storage media.

While the present disclosure provides various embodiments shown and described in detail, their modifications and improvements will become readily apparent to those skilled in the art. It is intended that the specification and examples be considered as exemplary only with the true scope and spirit of the present disclosure indicated by the following claims.

What is claimed is:

1. A computer-implemented method comprising:
   partitioning a plurality of rotating disk drives each into a plurality of slices;
   partitioning the plurality of rotating disk drives each into a plurality of performance partitions, wherein each of the plurality of performance partitions includes slices from one of the plurality of rotating disk drives having similar performance in accordance with an allowable difference or tolerance for any of data throughput, bandwidth and data transfer rate, wherein each of the plurality of rotating disk drives includes a plurality of subdrives each corresponding to slices of said each rotating disk drive included in a single one of the plurality of performance partitions, wherein each of the plurality of performance partitions of the plurality of rotating disk drives is associated with one of a plurality of performance levels denoting a relative performance ranking of performance partitions, wherein a plurality of performance partition tiers each include performance partitions of the plurality of rotating disk drives having a same one of the plurality of performance levels;

configuring a plurality of resiliency sets from the plurality of performance partition tiers, wherein each of the resiliency sets includes slices of subdrives from only one of the plurality of performance partition tiers;

and allocating a plurality of physical units from the plurality of resiliency sets, wherein each of the plurality of physical units denotes a mapped redundant array of independent disks (RAID) group configured from a number of slices of a single one of the plurality of resiliency sets, wherein the number of slices of said each physical unit is determined in accordance with a particular RAID level and configuration of the mapped RAID group, wherein each slice of said each physical unit is included in a different subdrive of the single one of the plurality of resiliency sets.

2. The computer-implemented method of claim 1, wherein each of the plurality of resiliency sets includes a number of subdrives each from a different one of the plurality of rotating disk drives.

3. The computer-implemented method of claim 2, wherein the number of subdrives of said each resiliency set is between a minimum and a maximum, and wherein the minimum and the maximum are determined in accordance with a RAID level and configuration of physical units that are allocated from said each resiliency set.

4. The computer-implemented method of claim 3, wherein the physical units allocated from said each resiliency set are mapped RAID groups each having the RAID level and configuration associated with said each resiliency set.

5. The computer-implemented method of claim 4, further comprising:
storing user data in the physical units allocated from said each resiliency set in accordance with a RAID algorithm for the RAID level and configuration associated with said each resiliency set.

6. The computer-implemented method of claim 5, further comprising:
for each of the plurality of resiliency sets having slices from only a single one of the plurality of performance tiers of performance partitions, reserving a portion of slices of said resiliency set as dedicated spare slices used only for said each resiliency set.

7. The computer-implemented method of claim 6, wherein a first of the plurality of rotating disk drives fails, and wherein the computer-implemented method further comprises:
performing first processing to reconstruct data of a first plurality of slices of the first rotating disk drive that failed, wherein the first plurality of slices are included in a first of the plurality of performance partitions of the first rotating disk drive and are included in a first of the plurality of resiliency sets that only includes slices from a first of the plurality of performance partition tiers;
for each of the first plurality of slices having reconstructed data determined by the first processing, performing second processing comprising:
selecting a spare slice from the first resiliency set of slices of the first performance partition tier; and
storing the reconstructed data of said each slice of the first rotating disk dive that failed in the spare slice selected from the first resiliency set of slices.

8. The computer-implemented method of claim 7, wherein said first processing includes reconstructing the data of the first plurality of slices of the first resiliency set using the RAID algorithm for the RAID level and configuration associated with said first resiliency set.

9. The computer-implemented method of claim 5, further comprising:
for one or more of the plurality of performance partition tiers having a lowest performance of all of the plurality of performance partition tiers, reserving at least a portion of each of the one or more performance partition tiers as dedicated spare slices.

10. The computer-implemented method of claim 9, wherein the one or more performance partition tiers having the lowest performance include slices located at innermost tracks of the plurality of rotating disk drives.

11. The computer-implemented method of claim 9, wherein a first of the plurality of rotating disk drives fails, and wherein the computer-implemented method further comprises:
performing first processing to reconstruct data of a first plurality of slices of the first rotating disk drive that failed, wherein the first plurality of slices are included in a first of the plurality of performance partitions of the first rotating disk drive and are included in a first of the plurality of resiliency sets that only includes slices from a first of the plurality of performance partition tiers;
for each of the first plurality of slices having reconstructed data determined by the first processing, performing second processing comprising:
selecting a spare slice from one of the one or more of the plurality of performance partition tiers having a lowest performance of all of the plurality of performance partitions tiers; and
storing, in the spare slice selected from the one performance partition tier, the reconstructed data of said each slice of the first rotating disk dive that failed.

12. The computer-implemented method of claim 11, wherein said first processing includes reconstructing the data of the first plurality of slices of the first resiliency set using the RAID algorithm for the RAID level and configuration associated with said first resiliency set.

13. The computer-implemented method of claim 12, wherein prior to the first rotating disk drive failing, the first rotating disk drive includes a first layout with slices of data stored at first locations on the first rotating disk drive, and wherein the first rotating disk drive that failed is replaced with a new rotating disk drive, and wherein the computer-implemented method further includes:
performing restriping that restores the reconstructed data from the spare slices selected to corresponding slices on the new rotating disk drive in accordance with the first layout of the first rotating disk drive.

14. A system comprising:
one or more processors;
and a memory comprising code stored therein that, when executed, performs a method comprising:
partitioning a plurality of rotating disk drives each into a plurality of slices;

partitioning the plurality of rotating disk drives each into a plurality of performance partitions, wherein each of the plurality of performance partitions includes slices from one of the plurality of rotating disk drives having similar performance in accordance with an allowable difference or tolerance for any of data throughput, bandwidth and data transfer rate, wherein each of the plurality of rotating disk drives includes a plurality of subdrives each corresponding to slices of said each rotating disk drive included in a single one of the plurality of performance partitions, wherein each of the plurality of performance partitions of the plurality of rotating disk drives is associated with one of a plurality of performance levels denoting a relative performance ranking of performance partitions, wherein a plurality of performance partition tiers each include performance partitions of the plurality of rotating disk drives having a same one of the plurality of performance levels;

configuring a plurality of resiliency sets from the plurality of performance partition tiers, wherein each of the resiliency sets includes slices of subdrives from only one of the plurality of performance partition tiers;

and allocating a plurality of physical units from the plurality of resiliency sets, wherein each of the plurality of physical units denotes a mapped redundant array of independent disks (RAID) group configured from a number of slices of a single one of the plurality of resiliency sets, wherein the number of slices of said each physical unit is determined in accordance with a particular RAID level and configuration of the mapped RAID group, wherein each slice of said each physical unit is included in a different subdrive of the single one of the plurality of resiliency sets.

15. The system of claim 14, wherein each of the plurality of resiliency sets includes a number of subdrives each from a different one of the plurality of rotating disk drives.

16. The system of claim 15, wherein the number of subdrives of said each resiliency set is between a minimum and a maximum, and wherein the minimum and the maximum are determined in accordance with a RAID level and configuration of physical units that are allocated from said each resiliency set.

17. The system of claim 16, wherein the physical units allocated from said each resiliency set are mapped RAID groups each having the RAID level and configuration associated with said each resiliency set.

18. The system of claim 17, further comprising:
storing user data in the physical units allocated from said each resiliency set in accordance with a RAID algorithm for the RAID level and configuration associated with said each resiliency set.

19. The system of claim 18, further comprising:
for each of the plurality of resiliency sets having slices from only a single one of the plurality of performance tiers of performance partitions, reserving a portion of slices of said resiliency set as dedicated spare slices used only for said each resiliency set.

20. A non-transitory computer readable medium comprising code stored thereon that, when executed, performs a method comprising:
partitioning a plurality of rotating disk drives each into a plurality of slices;

partitioning the plurality of rotating disk drives each into a plurality of performance partitions, wherein each of the plurality of performance partitions includes slices from one of the plurality of rotating disk drives having similar performance in accordance with an allowable difference or tolerance for any of data throughput, bandwidth and data transfer rate, wherein each of the plurality of rotating disk drives includes a plurality of subdrives each corresponding to slices of said each rotating disk drive included in a single one of the plurality of performance partitions, wherein each of the plurality of performance partitions of the plurality of rotating disk drives is associated with one of a plurality of performance levels denoting a relative performance ranking of performance partitions, wherein a plurality of performance partition tiers each include performance partitions of the plurality of rotating disk drives having a same one of the plurality of performance levels;

configuring a plurality of resiliency sets from the plurality of performance partition tiers, wherein each of the resiliency sets includes slices of subdrives from only one of the plurality of performance partition tiers;

and allocating a plurality of physical units from the plurality of resiliency sets, wherein each of the plurality of physical units denotes a mapped redundant array of independent disks (RAID) group configured from a number of slices of a single one of the plurality of resiliency sets, wherein the number of slices of said each physical unit is determined in accordance with a particular RAID level and configuration of the mapped RAID group, wherein each slice of said each physical unit is included in a different subdrive of the single one of the plurality of resiliency sets.

* * * * *